United States Patent
Wang et al.

(10) Patent No.: US 11,438,728 B2
(45) Date of Patent: Sep. 6, 2022

(54) LOCAL ENTITY FOR DETERMINATION OF USER EQUIPMENT LOCATION, USER EQUIPMENT, ACCESS NETWORK, GLOBAL ENTITY AND VEHICLE

(71) Applicant: HUAWEI TECHNOLOGIES CO., LTD., Shenzhen (CN)

(72) Inventors: Qi Wang, Munich (DE); Sandip Gangakhedkar, Munich (DE); Qing Wei, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 46 days.

(21) Appl. No.: 17/001,870

(22) Filed: Aug. 25, 2020

(65) Prior Publication Data
US 2020/0389759 A1   Dec. 10, 2020

Related U.S. Application Data

(63) Continuation of application No. PCT/EP2018/057042, filed on Mar. 20, 2018.

(51) Int. Cl.
*H04W 24/00* (2009.01)
*H04W 4/02* (2018.01)
(Continued)

(52) U.S. Cl.
CPC ............ *H04W 4/023* (2013.01); *G01S 5/0036* (2013.01); *H04W 4/029* (2018.02)

(58) Field of Classification Search
CPC ...... H04W 4/023; H04W 4/029; G01S 5/0036
See application file for complete search history.

(56) References Cited

U.S. PATENT DOCUMENTS

| 9,832,750 B2 | 11/2017 | Wigren et al. |
| 2005/0032532 A1* | 2/2005 | Kokkonen ............ H04L 63/101 455/456.6 |

(Continued)

FOREIGN PATENT DOCUMENTS

| CN | 101378587 A | 3/2009 |
| CN | 101730064 A | 6/2010 |

(Continued)

OTHER PUBLICATIONS

3GPP TS 22.261 V16.1.0, 3rd Generation Partnership Project;Technical Specification Group Services and System Aspects;Service requirements for the 5G system;Stage 1(Release 16), Sep. 2017, total 52 pages.

(Continued)

*Primary Examiner* — Erika A Washington
(74) *Attorney, Agent, or Firm* — Maier & Maier, PLLC

(57) ABSTRACT

A local entity is proposed for determination of user equipment location in a mobile communication network. The local entity is configured to be run on a first user equipment and/or in an access network. The local entity is configured to receive location information of a target user equipment, and determine a location of the target user equipment based on the location information. This is advantageous because the determination of the location can be improved with regard to a determination of the location carried out by the core network. Particularly, the location can be determined without the core network being involved.

17 Claims, 16 Drawing Sheets

(51) Int. Cl.
*H04W 4/029* (2018.01)
*G01S 5/00* (2006.01)

(56) References Cited

U.S. PATENT DOCUMENTS

| | | | |
|---|---|---|---|
| 2006/0089159 A1 | 4/2006 | Liu | |
| 2014/0364101 A1* | 12/2014 | Do | H04W 4/02 455/418 |
| 2017/0030994 A1* | 2/2017 | Meredith | H04W 4/90 |
| 2017/0332192 A1 | 11/2017 | Edge | |
| 2017/0339624 A1 | 11/2017 | Chan | |
| 2018/0014161 A1* | 1/2018 | Warren | H04W 4/023 |
| 2018/0091946 A1* | 3/2018 | Venkatraman | H04L 43/065 |

FOREIGN PATENT DOCUMENTS

| | | |
|---|---|---|
| CN | 105874829 A | 8/2016 |
| EP | 2 200 357 A1 | 6/2010 |
| WO | 2016/094681 A1 | 6/2016 |

OTHER PUBLICATIONS

3GPP TR 22.862 V14.1.0, 3rd Generation Partnership Project;Technical Specification Group Services and System Aspects;Feasibility Study on New Services and Markets Technology Enablers for CriticalCommunications;Stage 1 (Release 14), Sep. 2016, total 31 pages.
3GPP TS 23.271 V14.2.0, 3rd Generation Partnership Project;Technical Specification Group Services and System Aspects;Functional stage 2 description of Location Services (LCS)(Release 14), Jun. 2017, total 183 pages.
3GPP TS 23.501 V1.5.0, 3rd Generation Partnership Project;Technical Specification Group Services and System Aspects;System Architecture for the 5G System;Stage 2(Release 15), Nov. 2017, total 170 pages.
3GPP TS 23.501 V15.0.0, 3rd Generation Partnership Project;Technical Specification Group Services and System Aspects;System Architecture for the 5G System;Stage 2(Release 15), Dec. 2017, total 181 pages.
3GPP TS 36.305 V14.3.0, 3rd Generation Partnership Project;Technical Specification Group Radio Access Network; Evolved Universal Terrestrial Radio Access Network (E-UTRAN);Stage 2 functional specification of User Equipment (UE) positioning in E-UTRAN(Release 14), Sep. 2017, total 78 pages.
3GPP TS 36.355 V14.2.0, 3rd Generation Partnership Project;Technical Specification Group Radio Access Network; Evolved Universal Terrestrial Radio Access (E-UTRA);LTE Positioning Protocol (LPP)(Release 14), Jun. 2017, total 167 pages.
3GPP TS 36.355 V14.4.0,3rd Generation Partnership Project;Technical Specification Group Radio Access Network; Evolved Universal Terrestrial Radio Access (E-UTRA);LTE Positioning Protocol (LPP)(Release 14), Dec. 2017, total 168 pages.
3GPP TS 36.455 V14.2.0,3rd Generation Partnership Project;Technical Specification Group Radio Access Network; Evolved Universal Terrestrial Radio Access (E-UTRA);LTE Positioning Protocol A (LPPa)(Release 14), Jun. 2017, total 74 pages.
3GPP TR 38.913 V14.3.0,3rd Generation Partnership Project;Technical Specification Group Radio Access Network; Study on Scenarios and Requirements for Next Generation Access Technologies;(Release 14), Jun. 2017, total 39 pages.
3GPP TS 38.305 V1.0.0,3rd Generation Partnership Project;Technical Specification Group Radio Access Network;NG Radio Access Network (NG-RAN);Stage 2 functional specification of User Equipment (UE) positioning in NG-RAN (Release 15), Mar. 2018, total 54 pages.
Qualcomm Incorporated, "Discussion of Positioning Support for NG-RAN in Release 15", 3GPP TSG-RAN WG2 Meeting #99, R2-1709478, Berlin, Germany, Aug. 21-25, 2017, total 8 pages.
NTT Docomo, Inc.,"Revised WID on New Radio Access Technology", 3GPP TSG RAN Meeting #75, RP-171485, West Palm Beach, USA, Jun. 5-8, 2017, total 11 pages.
Intel Corporation et al., "New SID: Study on NR Positioning Support", 3GPP TSG RAN Meeting #77,RP-171814, Sapporo, Japan, Sep. 11-14, 2017, total 5 pages.
Intel Corporation,"Motivation for SI: Study on NR Positioning Support",3GPP TSG RAN Meeting #77, RP-171815, Sapporo, Japan, Sep. 11-14, 2017, total 11 pages.
CATT,"Motivation for new Study Item on NR Positioning", 3GPP TSG RAN #77,RP-171860,Sapporo, Japan, Sep. 11-14, 2017, total 12 pages.
Qualcomm, "Motivation for Study Item onPositioning Support for NR",3GPP RAN #77,RP-171986,Sapporo, Japan, Sep. 11-14, 2017, total 6 pages.
CATT et al,"New SID on Service Based Architecture for Location Services (FS_eLCS)",SA WG2 Meeting #124, S2-178936, Nov. 27-Dec. 1, 2017, Reno, USA, total 4 pages.
CATT,"Architecture Requirements for eLCS", SA WG2 Meeting #125,S2-180698,Jan. 22-26, 2018, Gothenburg, Sweden, total 2 pages.
Qualcomm Incorporated et al,"Key Issue on Low Latency for 5GC Location Enhancement",SA WG2 Meeting #125, S2-180907, Jan. 22-26, 2018, Gothenburg, Sweden, total 2 pages.
Qualcomm Incorporated,"Key Issue on Scalability for 5GC Location Enhancement",SA WG2 Meeting #125,S2-180911, Jan. 22-26, 2018, Gothenburg, Sweden, total 2 pages.
Wymeersch et al.,"Cooperative Localization in Wireless Networks", Proceedings of the IEEE vol. 97, No. 2, Feb. 2009, total 24 pages.
Hlinka et al.,"Distributed Particle Filtering in Agent Networks: A Survey, Classification, and Comparison",IEEE Signal Processing Magazine, vol. 30, No. 1, Jan. 2013, total 39 pages.
Shen et al.,"Fundamental Limits of Wideband Localization—Part II: Cooperative Networks",IEEE Transactions on Information Theory, vol. 56, No. 10, Oct. 2010, total 20 pages.
Soatti et al.,"Implicit Cooperative Positioning in Vehicular Networks", GNSSarXiv:1709.01282v1 [cs.NI] Sep. 5, 2017, total 15 pages.
Gentner et al.,"Multipath Assisted Positioning with Simultaneous Localization and Mapping",IEEE Transactions on Wireless Communications, vol. 15, No. 9, Sep. 2016, total 14 pages.
Hugh Durrant-Whyte et al.,"Simultaneous Localization and Mapping: Part I",IEEE Robotics and Automation Magazine, Jun. 2006, total 10 pages.
Huawei, HiSilicon, Solution for slice dependent location service. SA WG2 Meeting #126, Feb. 26-Mar. 2, 2018, Montreal, Canada, S2-182128, 3 pages.
Qualcomm Incorporated, Addition of an LMF Based Location Solution. SA WG2 Meeting #126, Feb. 26-Mar. 2, 2018, Montreal, Canada, S2-182081, 20 pages.

* cited by examiner

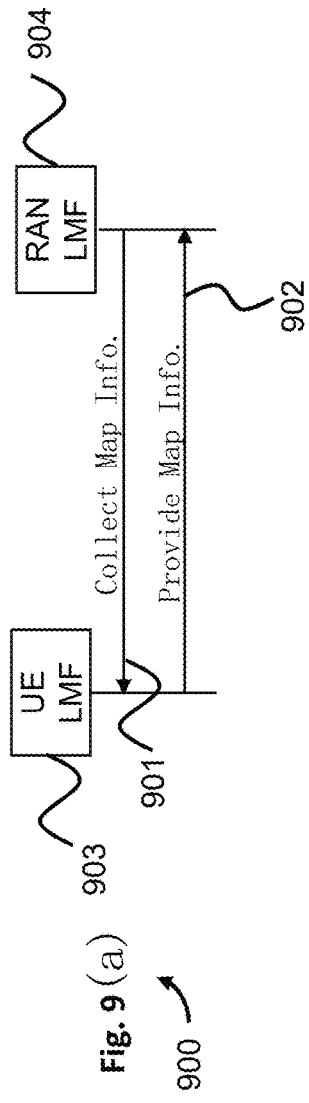
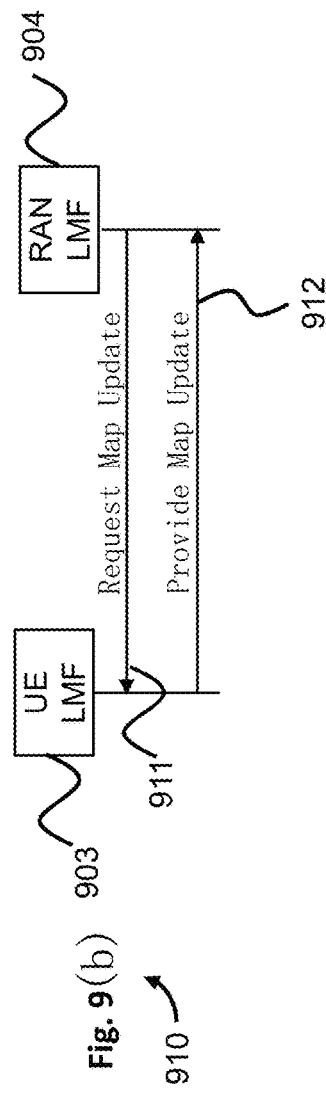
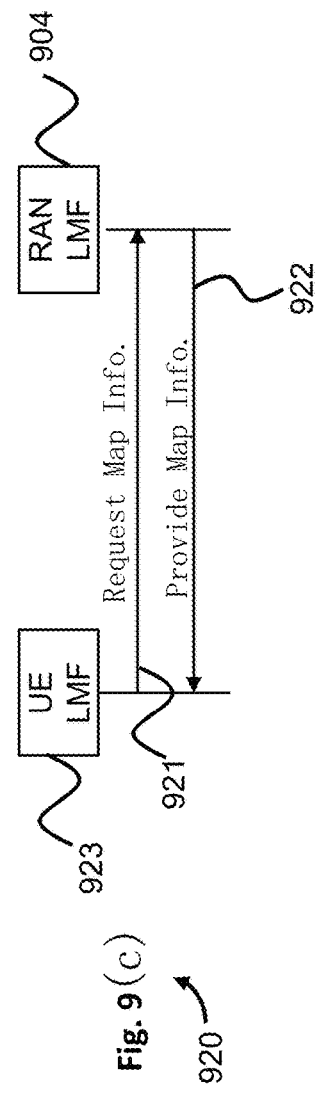
Fig. 9(a) 900
Fig. 9(b) 910
Fig. 9(c) 920

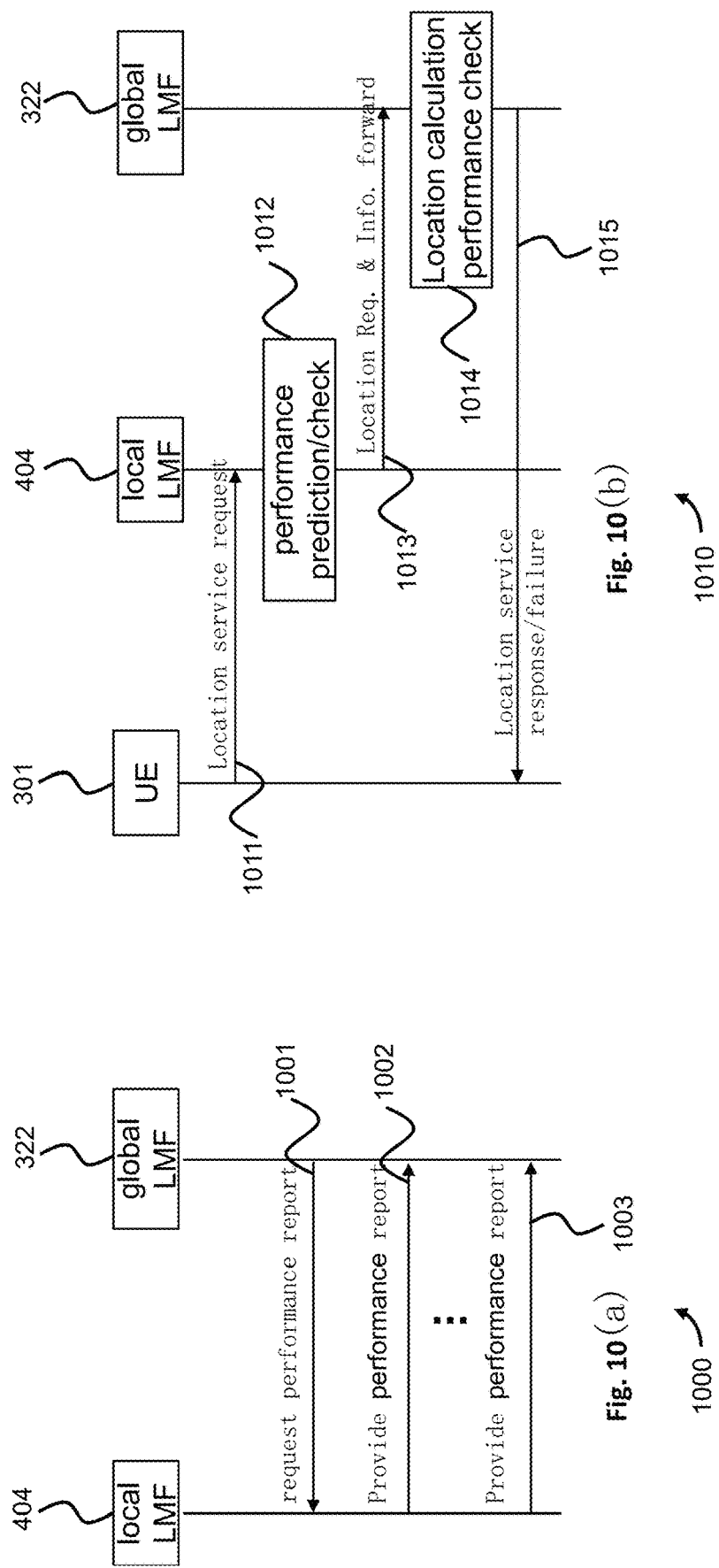

LOCAL ENTITY FOR DETERMINATION OF USER EQUIPMENT LOCATION, USER EQUIPMENT, ACCESS NETWORK, GLOBAL ENTITY AND VEHICLE

CROSS-REFERENCE TO RELATED APPLICATIONS

This application is a continuation of International Application No. PCT/EP2018/057042, filed on Mar. 20, 2018, the disclosure of which is hereby incorporated by reference in its entirety.

TECHNICAL FIELD

The embodiments generally relate to the field of mobile communication technology. Further, the embodiments relate to a local entity for determination of user equipment location in a mobile communication network, to a user equipment or access network, to a global entity for determination of user equipment location, and to a vehicle.

BACKGROUND

High accuracy positioning has been identified as one of the key features for next generation cellular systems. In this respect, it is for example referred to 3GPP TS22.261 V16.1.0 Service requirements for the 5G system; Stage 1 (Release 16) 2017 September. 5G refers to 5th generation mobile networks. Given the new potentials of the new radio (NR) access technology (RAT) of 5G, 5G location/positioning service targets to meet a full set of performance requirements, support for range of accuracy levels, latency levels and device categories. Such services allow for efficient signaling over the air interface and in the network, support for hybrid positioning methods, scalability in terms of large number of devices, etc., as referred to e.g. in 3GPP TR 38.913 V14.3.0, Study on Scenarios and Requirements for Next Generation Access Technologies, 2017 June.

Known positioning systems fall into two categories, namely RAT-independent technology and RAT-dependent technologies.

Regarding RAT-independent technologies, the most common example of position system is the global navigation satellite system (GNSS) based approaches. Examples are the Global Positioning System (GPS), the GLONASS system and the Galileo system. However, for indoor or urban canyon scenarios where satellite reception is poor, this technology exhibits its limitation. Another popular technology within industrial community is based on ultra-wideband (UWB) wireless system. Typically, a UWB localization system promises centimeter level accuracy. However, deployment of such a system generates additional cost. Also, its availability is limited.

Examples of RAT-dependent technologies typically include E-CellID and Observed Time Difference of Arrival (OTDoA), as e.g. described in 3GPP TS23.271 V14.2.0 Functional stage 2 description of Location Services (LCS), (Release 14), 2017 June.

In E-CellID, the user equipment (UE) reports the cell ID and timing advance to the network. The location server in the core network (CN) calculates UE's position based on the measurements. For OTDoA, the UE measures the receive signal time difference (RSTD) from two eNodeBs and reports the RSTD measurements to the location server. The location server estimates UE's position based on at least two RSTD measurements. In the current version of 5G system architecture, location service has been agreed as topic for future study, as can be taken from 3GPP TS 23.501 V15.0.0 System Architecture for the 5G system; Stage 2 (Release 15), 2017 November.

FIG. 1 shows a known system 100 for determining the location of a UE 101. The system 100 corresponds to the system proposed in 3GPP TS 23.501 V15.0.0, see section 4.4.4.1 "Architecture to support Location Services" and Figure 4.4.4.1-2 "Non-roaming reference architecture for Location Services in reference point representation".

In the system 100, a location server 104, namely Location Management Function (LMF), which is a functionality block located in a next generation core network (NGC) 103, calculates the position/location of the UE 101. The UE 101 is connected to a next generation-radio access network (NG-RAN) 102 that is linked to the NGC 103. The NGC 103 includes the LMF 104, an access management function (AMF) 106, a gateway mobile location center (GMLC) 107, a user data management (UDM) 105 and a location retrieval function (LRF) 108. An external client 109 is linked to the GMLC 107.

The RAT-dependent technology, as shown in FIG. 1, is a network-centric approach and mainly serves for the network operation purpose such as emergency call delivery, location based service etc.

FIG. 2 shows a method 200 for determining the location of the UE 101 in the system 100 of FIG. 1. The method 200 is corresponds to the LTE Positioning Protocol (LPP) of 3GPP TS 36.355 V14.4.0 (2017 December) and is an example of OTDoA procedure. The method 200 involves the UE 101, the RAN 102 and the LMF 104 located in the core network 103.

In a first step, the UE sends 201 a location service request to the LMF. The LMF responds 202 with an LPP request capabilities message for indicating the types of capability needed to determine the UE location. Capabilities in this context refer to positioning and protocol capabilities related to LPP and the positioning methods supported by LPP. The UE responds 203 with an LPP provide capabilities message to the LMF. The LMF then sends 204 LPP provide assistance data to the UE, the assistance data being used to assist in positioning. After the UE receives 205 an LPP request location information message from the LMF, the UE or the RAN 102 performs 206 the RSTD measurements, and the UE sends 207 an LPP provide location information message comprising the measurements to the LMF. The LMF then calculates 208 the UE location based on the measurements and sends 209 to the UE a location service response comprising the UE location.

As the number of location service requests from the UE side increases, the protocol overhead increases dramatically. The known network-centric design is thus particularly disadvantageous when location service requests are originated from the UE side. Since the measurement information is required at the LMF in the CN, the heavy protocol layering makes it difficult for latency-critical position acquisition on the UE side.

SUMMARY

Having recognized the above-mentioned disadvantages and problems, the embodiments aim to improve the state of the art. In particular, an object of the embodiments is to provide an improved location service.

According to a first aspect, an embodiment relates to a local entity for determination of user equipment location in a mobile communication network. The local entity is configured to be run on a first user equipment and/or in an access network. The local entity is configured to receive location information of a target user equipment. The local entity is configured to determine a location of the target user equipment based on the location information.

The local entity can be a (distributed) location management function according to terminology used in the standard 3GPP 23.501 V15.0.0, where the local entity is configured to run on a user equipment and/or on an access network.

This is advantageous because the determination of the location can be improved with regard to a determination of the location carried out by the core network. Particularly, the location can be determined without the core network being involved. This leads to a low latency, which can be crucial e.g. for applications like real-time application, and more generally for application requiring latency-critical position acquisition on the user equipment side.

According to a further implementation of the first aspect, the local entity is configured to receive a location request, such as from the target user equipment, from another local entity, and/or from an entity of a core network. The local entity is configured to determine the location based on the location request.

Thereby, the location can be determined after reception of the location request with low latency. The determined location can be transmitted, in response to the location request, to the target user equipment, to the other local entity, and/or to the entity of the core network. Advantageously, the location determination can be controlled by the target user equipment, the other local entity, and/or the entity of the core network. The received location request can include the location information. Alternatively, the location request and the location information can be received separately.

According to a further implementation of the first aspect, the target user equipment is the first user equipment, or the target user equipment is a second user equipment.

Thereby, the target user equipment can be the first user equipment. Alternatively, the target user equipment can be a second user equipment that can be linked to the first user equipment. In such a case, the first user equipment and the second user equipment can, e.g., be linked via a sidelink. The first user equipment and the second user equipment can be neighbor user equipment or can e.g. be clustered to a group of user equipment. The determination of the location can be improved. It is not necessary to involve the core network.

According to a further implementation of the first aspect, the location information includes downlink, uplink, and/or sidelink location information of the target user equipment.

Thereby, the location information can include downlink location information of the target user equipment. Advantageously, the location of the target user equipment can be advantageously determined based on measurement information available at the target user equipment. The downlink location information can be location information related to a downlink between, e.g., the target user equipment and the access network.

Thereby, the location information can include uplink location information of the target user equipment. Advantageously, the location of the target user equipment can be advantageously determined based on measurement information available at the access network. The uplink location information can be location information related to an uplink between, e.g., the target user equipment and the access network.

Thereby, the location information can include sidelink location information of the target user equipment. The sidelink location information can be location information related to a sidelink between e.g. the target user equipment and the first user equipment. Advantageously, the location of the target user equipment can be determined based on measurement information available at the target user equipment or at the first user equipment.

According to a further implementation of the first aspect, the local entity is configured to determine an accuracy of the location of the target user equipment based on the location information.

Thereby, the determination of the accuracy of the location can be improved with regard to a determination of the accuracy of the location carried out by the core network. Thus, the latency can be improved and reduced.

According to a further implementation of the first aspect, the local entity is configured to transmit a capability request. The local entity is configured to receive capability information of the first user equipment or of the access network. The capability information indicates the capability of the first user equipment or the access network to run the local entity.

Thereby, if the local entity is run on the first user equipment, it can advantageously assess whether it can be extended or switch to the access network, and vice versa. If a capability request is transmitted the capability information can be send in response to the respective request. Advantageously, it can be checked if a local entity can be extended to a device that should report its location information but includes no local entity (yet). Furthermore, it can be determined whether or not the first user equipment or the access network is able to run the local entity. Therefore, the capability request can be transmitted to the first user equipment or the access network. The capability information can be received from the first user equipment or the access network.

Thereby, the local entity can advantageously request and receive the capability information regarding the user equipment or the access network entity on which a potential local entity shall be established. Thus, it can be determined whether or not the potential local entity can be run on the respective user equipment or access network entity.

According to a further implementation of the first aspect, the local entity is configured to receive an authorization request, such as from a user equipment and/or an access network. The local entity is configured to transmit an authorization response, such as to a user equipment and/or an access network.

Thereby, the local entity can determine if an authorization can be granted to the user equipment or the access network to run a further local entity.

According to a further implementation of the first aspect, the local entity is configured to receive location information of one or more features. The local entity is configured to determine a location of the one or more features based on the respective location information. The local entity is configured to generate a map or list of the location of the one or more features.

A feature can be a radio reflector or scatterer, a geographical landmark or a virtual transmit receive point. Thereby, the map or list can be utilized to enhance positioning accuracy of a local area or the overall system performance.

According to a further implementation of the first aspect, the local entity is configured to receive a location and/or location information for the one or more features. The local entity is configured to determine an updated location of the one or more features based on the received location and/or location information. The local entity is configured to transmit the updated location of the one or more features.

Thereby, the map or list can be actualized and improved over time.

According to a further implementation of the first aspect, the local entity is configured to receive a location request, in particular for one or more features. The local entity is configured to transmit the locations of the requested features in response to the location request.

Thereby, the location request can be received by a core network entity, access network, a UE, other local entity and/or an entity outside of an operator network. The recipient of the locations of the requested features may advantageously use the received locations to localize itself with respect to the requested features.

According to a further implementation of the first aspect, the local entity is configured to determine a performance information of the determination of the location of the target user equipment. The local entity is configured to transmit the performance information.

Thereby, different charging policies can be applied to the location service depending on the performance information.

According to a further implementation of the first aspect, the local entity is configured to forward the location request to another entity for determination of user equipment location depending on the performance information.

Thereby, if the performance reflected by the performance information is not sufficient, the location request can be forwarded to another entity so as to achieve a desired performance.

According to a second aspect, the embodiments relate to a local entity, according to the first aspect, configured to transmit and/or receive location information from a second local entity.

Thereby, the local entity and the second local entity can advantageously cooperate and exchange location information as part of a location service management between local entities.

According to a third aspect, the embodiments relate to a method for determination of user equipment location at a local entity running on a first user equipment and/or in an access network. The method includes receiving location information of a target user equipment. The method includes determining a location of the target user equipment based on the location information.

This is advantageous because the determination of the location can be improved with regard to a determination of the location carried out by the core network. As a result, the location can be determined without the core network being involved. This leads to a low latency, which can be crucial, e.g., for applications like real-time application, and more generally for application requiring latency-critical position acquisition on the user equipment side.

According to a further implementation of the third aspect, the method includes receiving a location request, such as from the target user equipment, from another local entity, and/or from an entity of a core network. The method includes determining the location based on the location request.

Thereby, the location can be determined after reception of the location request with low latency.

According to a further implementation of the third aspect, the target user equipment is the first user equipment, or the target user equipment is a second user equipment.

Thereby, the determination of the location can be improved. It is not necessary to involve the core network.

According to a further implementation of the third aspect, the location information includes downlink, uplink, and/or sidelink location information of the target user equipment.

Advantageously, the location of the target user equipment can be determined based on measurement information available at the target user equipment or at the first user equipment or in the access network.

According to a further implementation of the third aspect, the method includes determining an accuracy of the location of the target user equipment based on the location information.

Thereby, the determination of the accuracy of the location can be improved with regard to a determination of the accuracy of the location carried out by the core network. Thus, the latency can be improved and reduced.

According to a further implementation of the third aspect, the method includes transmitting a capability request. The method includes receiving capability information of the first user equipment or of the access network. The capability information indicates the capability of the first user equipment or the access network to run the local entity.

Thereby, if the local entity is run on the first user equipment, it can advantageously assess whether it can be extended or switch to the access network, and vice versa. If a capability request is transmitted the capability information can be send in response to the respective request. Advantageously, it can be checked if a local entity can be extended to a device that should report its location information but includes no local entity (yet). Furthermore, it can be determined whether or not the first user equipment or the access network is able to run the local entity. Further, the capability request can be transmitted to the first user equipment or the access network. The capability information can be received from the first user equipment or the access network.

Thereby, the local entity can advantageously request and receive the capability information regarding the user equipment or the access network entity on which a potential local entity shall be established. Thus, it can be determined whether or not the potential local entity can be run on the respective user equipment or access network entity.

According to a further implementation of the third aspect, the method includes receiving an authorization request, such as from a user equipment and/or an access network. The method includes transmitting an authorization response, such as to a user equipment and/or an access network.

Thereby, the local entity can determine if an authorization can be granted to the user equipment or the access network to run a further local entity.

According to a further implementation of the third aspect, the method includes receiving location information of one or more features. The method includes determining a location of the one or more features based on the respective location information. The method includes generating a map or list of the location of the one or more features.

Thereby, the map or list can be utilized to enhance positioning accuracy of a local area or the overall system performance.

According to a further implementation of the third aspect, the method includes receiving a location and/or location information for the one or more features. The method includes determining an updated location of the one or more features based on the received location and/or location information. The method includes transmitting the updated location of the one or more features.

Thereby, the map or list can be actualized and improved over time.

According to a further implementation of the third aspect, the method includes receiving a location request, in particular for one or more features. The method includes transmitting the locations of the requested features in response to the location request.

Thereby, the location request can be received by a core network entity, access network, a UE, other local entity and/or an entity outside of an operator network. The recipient of the locations of the requested features may advantageously use the received locations to localize itself with respect to the requested features.

According to a further implementation of the third aspect, the method includes determining a performance information of the determination of the location of the target user equipment. The method includes transmitting the performance information.

Thereby, different charging policies can be applied to the location service depending on the performance information.

According to a further implementation of the third aspect, the method includes forwarding the location request to another entity for determination of user equipment location depending on the performance information.

Thereby, if the performance reflected by the performance information is not sufficient, the location request can be forwarded to another entity so as to achieve a desired performance.

According to a fourth aspect, the invention relates to a user equipment or an access network configured to transmit to a network entity capability information, where the capability information indicates the capability of the user equipment or the access network to run a local entity. In addition thereto or alternatively, the user equipment or access network is configured to transmit an authorization request to run a local entity according to the first or second aspect.

According to a fifth aspect, the invention relates to a global entity for determination of user equipment location. The global entity is configured to control one or more local entities, according to the first or second aspect.

According to a further implementation of the fifth aspect, the global entity is configured to be run on a hardware, such as user equipment, an access network, a core network, or a cloud.

A cloud can be an entity which is outside a core network and/or which does not belong to an operator or public land mobile network (PLMN). It can be an edge computing entity.

According to a further implementation of the fifth aspect, the global entity is configured to receive capability information of a hardware indicating its capability to run the local entity. Thus, the global entity is configured to instantiate the local entity based on the capability information.

Thereby, the global entity can advantageously select which hardware shall run a local entity depending on the received capability information.

According to a further implementation of the fifth aspect, the global entity is configured to transmit a capability request.

Thereby, the core network may control the process of instantiating local entities. The capability request can be transmitted to a potential local entity to be instantiated.

According to a further implementation of the fifth aspect, the global entity is configured to instantiate, configure and/or de-instantiate the local entity based on a number of location requests and/or a performance information, such as a positioning latency and/or accuracy.

Thereby, if the number of location service requests increases within a given geographical area, a local entity can be instantiated within this geographical area so as to improve the service.

According to a sixth aspect, the invention relates to a vehicle comprising a user equipment, and a local entity, i according to the first or second aspect. The hardware of the local entity is the user equipment.

Thereby, the latency can be reduced for location services involving vehicles, e.g. for convoy/platooning services.

Further, it can be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

These and other aspects will be apparent and elucidated with reference to the embodiments described hereinafter.

BRIEF DESCRIPTION OF THE DRAWINGS

The above aspects and implementation forms of the embodiments will be explained in the following description of specific embodiments in relation to the enclosed drawings, in which FIG. 9(a) shows a procedure for location service management, such as for map service, according to a further embodiment, FIG. 9(b) shows a procedure for location service management, such as for map service, according to a further embodiment, FIG. 9(c) shows a procedure for location service management, such as for map service, according to a further embodiment, FIG. 10(a) shows a procedure for location performance control according to a further embodiment, FIG. 10(b) shows a procedure for location performance control according to a further embodiment.

DETAILED DESCRIPTION OF EMBODIMENTS OF THE INVENTION

Figure 1:
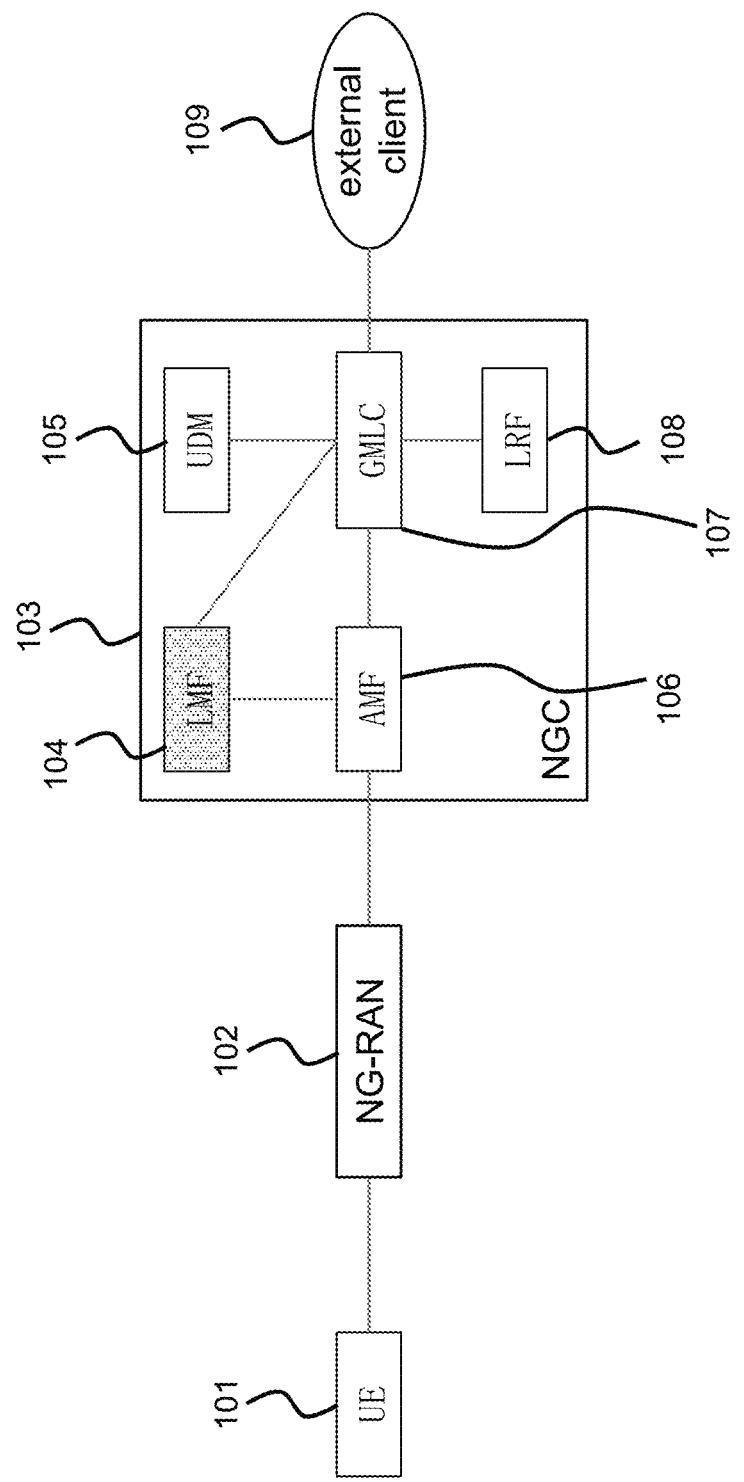
FIG. 1 shows a known system for determining the location of a UE.
Figure 2:
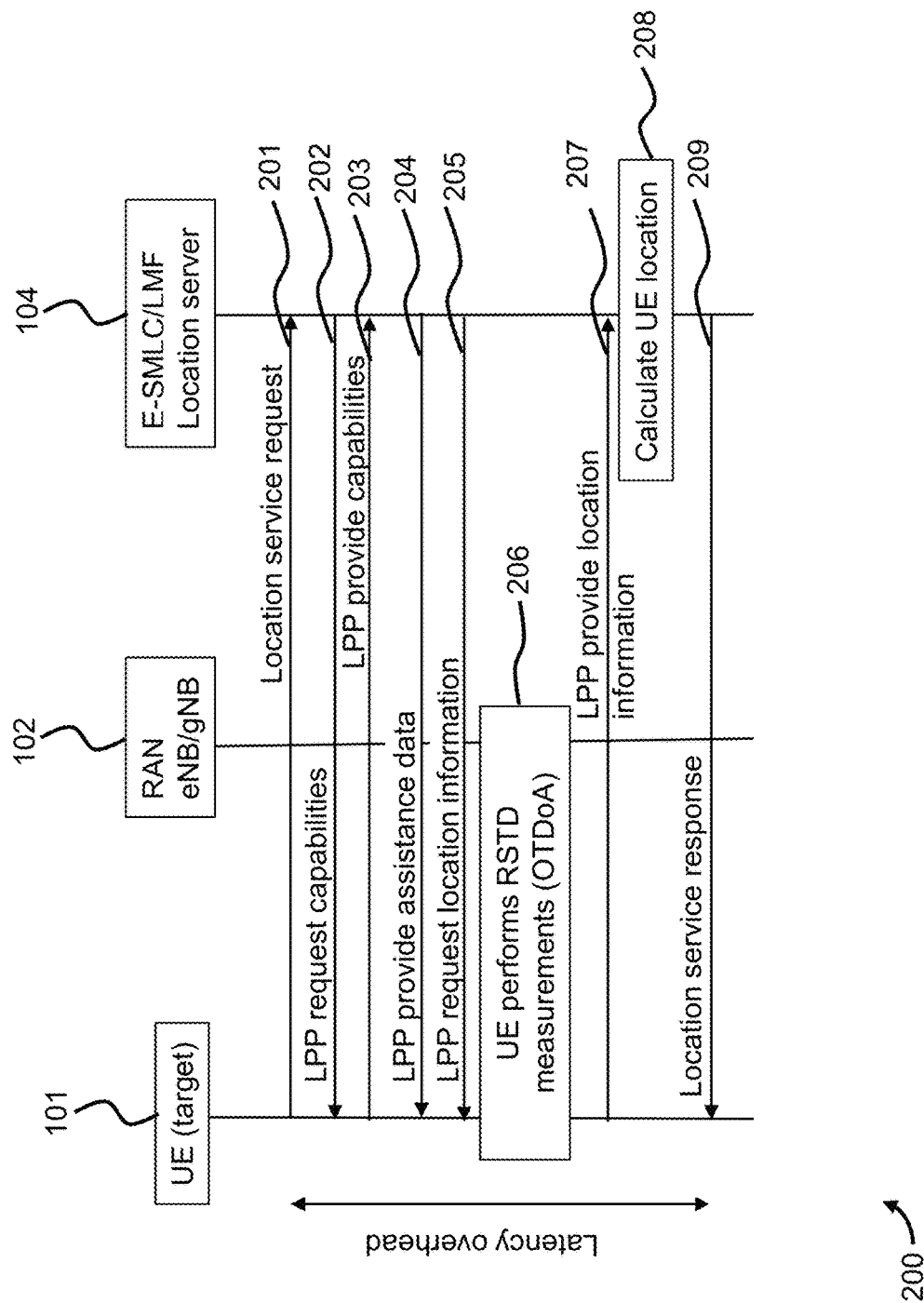
FIG. 2 shows a method for determining the location of the UE in the system of FIG. 1.
Figure 3:
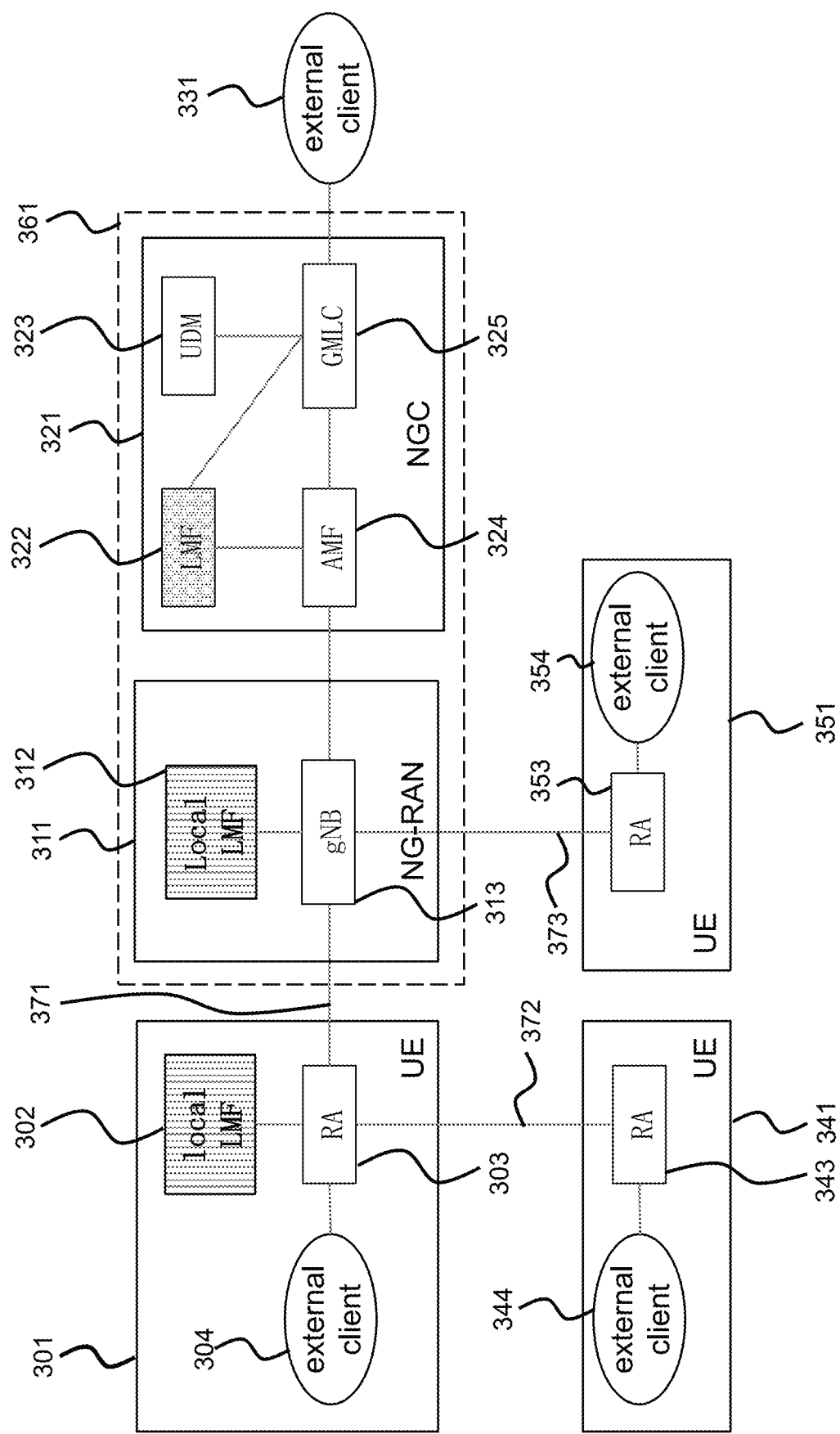
FIG. 3 shows a system according to an embodiment.

FIG. 3 shows a system 300 according to an embodiment.

The system 300 includes a first user equipment (UE) 301. The system 300 includes a network or mobile communication network 361 that can be e.g. a 5G, LTE or GSM network. The network 361 includes an access network or radio access network (RAN) 311, which can be for example in the form of a next generation-radio access network (NG-RAN), and a core network (CN) 321, which can be in the form of a next generation core network (NGC).

The system 300 includes a local entity 302 that can be referred to as UE local entity 302. The UE local entity 302 is configured to be run on the first UE 301. The system includes a local entity 312 that can be referred to as RAN local entity 312. The RAN local entity 312 is configured to be run on the access network 311. The UE local entity 302 and/or the RAN local entity 312 are configured to:
receive location information of a target UE, and
determine a location of the target UE based on the location information.

The target UE can be the first UE 301. The UE local entity 302 then can receive the location information without requiring any wireless transmission. The RAN local entity 312 can receive the location information via the uplink 371 between the first UE 301 and the RAN 311.

Alternatively, the target UE can be a second UE like a UE 341 connected to the first UE 301. The UE local entity 302 can receive the location information of the UE 341 by a sidelink 372 between the first UE 301 and the UE 341. The RAN local entity 312 can receive the location information of the UE 341 by the sidelink 372 and by the uplink 371 between the first UE 301 and the RAN 311.

The target UE can also be a second UE like a UE 351 connected to the RAN 311. The RAN local entity 312 can receive the location information of the UE 351 by an uplink 373 between the UE 351 and the RAN 311. The UE local entity 302 can receive the location information of the UE 351 by the uplink 373 between the UE 351 and the RAN 311 and by the downlink 371 between the RAN 311 and the first UE 301.

The location information can include downlink, uplink, and/or sidelink location information of the target user equipment.

The downlink location information can be location information regarding the downlink 371 from the RAN 311 to the first UE 301. The uplink location information can be location information regarding the uplink 371 from the first UE 301 to the RAN 311

The sidelink location information can be location information regarding the sidelink 372 between the first UE 301 to the UE 341.

Alternatively, the downlink location information can be location information regarding the downlink 373 from the RAN 311 to the UE 351. The uplink location information can be location information regarding the uplink 373 from the UE 351 to the RAN 311.

Location information can be location measurement information, e.g. time of arrival (ToA), angle of departure (AoD), angle of arrival (AoA), or GPS coordinates. Location information regarding a given downlink, uplink or sidelink can e.g. be ToA, AoD, or AoA for the given downlink, uplink or sidelink.

The RAN 311 includes a base station 313. The base station 313 can be in the form of a next generation NodeB (gNB) in 5G. Each UE 301, 341, 351 includes a radio access module (RA) 303, 343, 353. The RA 303 of the first UE 301 is configured to communicate with the base station 313 of the RAN 311 over the downlink/uplink 371 and to communicate with the RA 343 of the UE 341 over the sidelink 372. The RA 353 of the UE 351 is configured to communicate with the base station 313 of the RAN 311 over the downlink/uplink 373. Within each UE 301, 341, 351, an external client 304, 344, 354 is connected to the RA 303, 343, 353.

The CN 321 includes a global entity 322, also referred to as location management function (LMF) in 3GPP TS 23.501 V15.0.0, see e.g. section 6.2.16 "LMF". The global entity is configured to calculate the location of the first UE 301, of the UE 341 or of the UE 351. The global entity 322 includes the following functionality:
supports location determination for a UE 301, 341, 351,
obtains downlink location information or a location estimate from the UE 301, 341, 351,
obtains uplink location information from the RAN 311, and
obtains non-UE associated assistance data from the RAN 311.

The CN 321 includes the global entity 322, an access management function (AMF) 324, a gateway mobile location center (GMLC) 325, a user data management (UDM) 323. An external client 331 is connected to the GMLC 325. The AMF 324 provides transport for location service messages between the UE 301, 341, 351 and the global entity 322 as well as between the RAN 311 and the global entity 322. The AMF 324 and the UDM 323 are configured according to 3GPP TS 23.501 V15.0.0, see e.g. section 6.2.1 "AMF" and section 6.2.7 "UDM".

The UE local entity 302 and/or the RAN local entity 312 can be configured to:
receive a location request, and
determine the location based on the location request.

The UE local entity 302 can be configured to receive the location request from the target UE, from another local entity like the RAN local entity 312, and/or from an entity of the CN 321 like the global entity 322. The RAN local entity 312 can be configured to receive the location request from the target UE, from another local entity like the UE local entity 302, and/or from an entity of the CN 321 like the global entity 322.

The location request can include a request issued by the target UE that wants to know its location and a request sent by the network to obtain a location from the UE or the target UE. The location request can include one or more requirements, such as latency and/or accuracy of the localization.

The local entities 302, 312 and the global entity 322 can form a hierarchical structure. Therefore, the local entities 302, 312 and the global entity 322 can include the following management functionalities:
a) capability verification,
b) authorization,
c) location service management,
d) location group management,
e) location performance control, and
f) local entity instantiation, configuration, migration and deletion.

The local entities 302, 312 can implement a reduced set of the global entity's 322 management functionalities.

Figure 4:
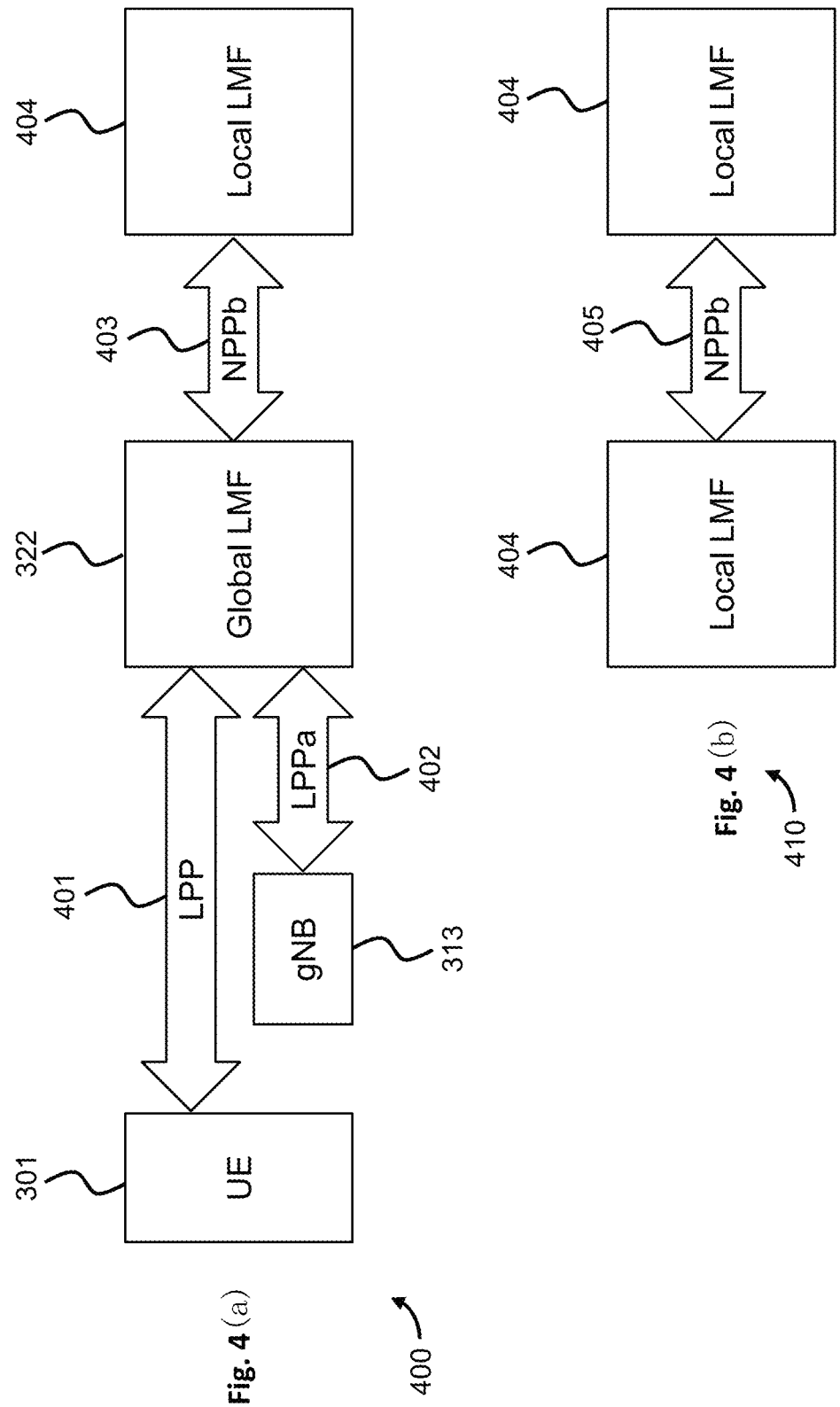
FIG. 4(a) shows a system according to further embodiments.
FIG. 4(b) shows a system according to further embodiments.

FIG. 4 shows systems 400, 410 according to further embodiments.

The system 400 shows a communication between the global entity 322 and the local entity 404, performed according to a protocol referred to as NR positioning protocol b (NPPb) 403. The system 400 also shows a communication between the global entity 322 and the first UE 301 based on an LTE positioning protocol (LPP) according to 3GPP TS 36.355 V14.4.0. The system 400 also shows a communication between the global entity 322 and the base station 313 based on an LTE positioning protocol A (LPPa) according to 3GPP TS 36.455 V14.4.0.

The system 410 shows a communication between two local entities 404, for example between local entity 302 and 312. This communication is performed according to a protocol referred to as NPPb 405 that can be the same as the NPPb 403.

Figure 5:
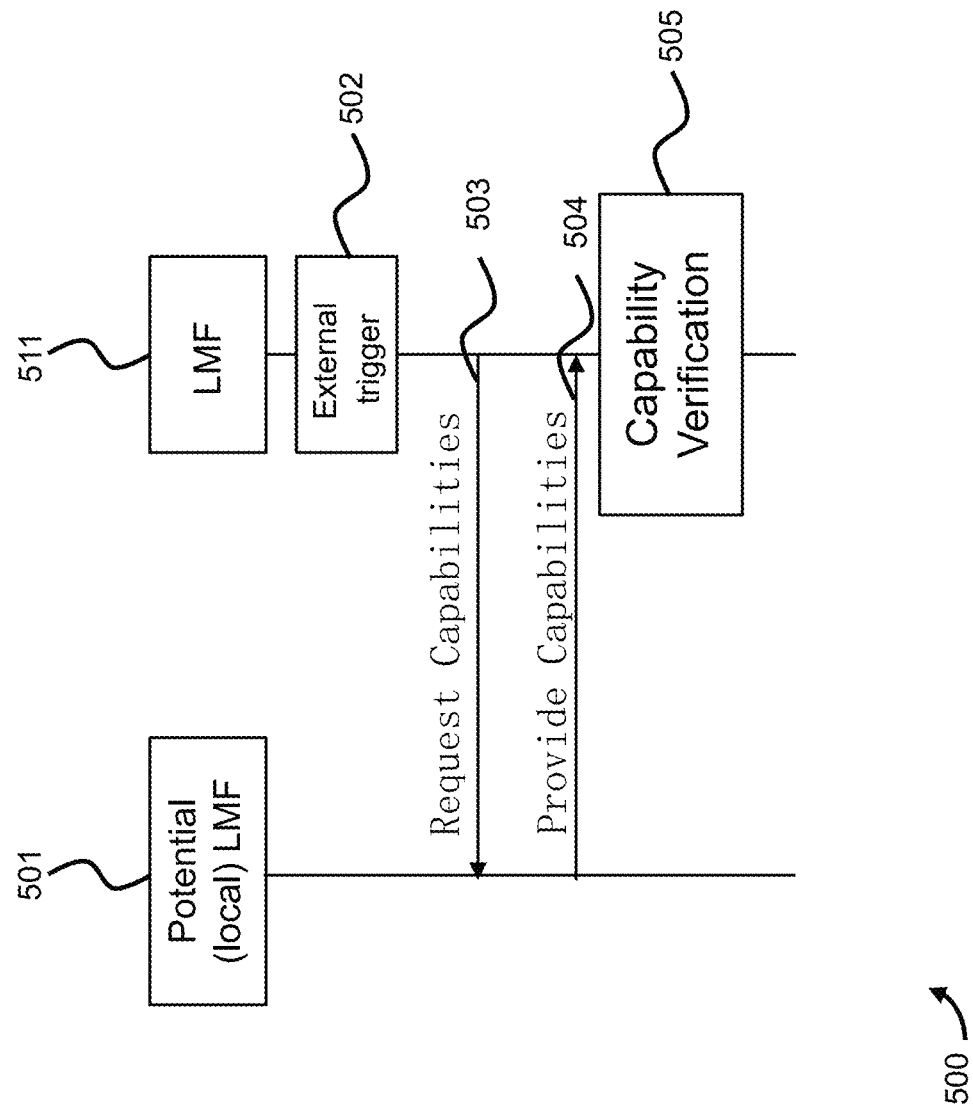
FIG. 5 shows a procedure for capability verification according to a further embodiment.

FIG. 5 shows a procedure 500 for capability verification according to a further embodiment.

The local entity 302, 312 or the (a) global entity 322 can be configured to:
transmit 503 a capability request, and
receive 504 capability information of a UE or of a RAN, where the capability information indicates the capability of the UE or the RAN to run the local entity 302, 312.

FIG. 5 shows a capability check procedure initiated by an entity 511 that is already established or instantiated. The entity 511 can be the local entity 302, 312 or the global entity 322.

Before establishing or instantiating a further potential local entity 501, the entity 511 checks the capability of the potential UE or the potential RAN entity that is designed to run the potential local entity 501. The capability can be checked in terms of at least one of the following parameters of the potential UE or potential RAN entity that is designed to run the potential local entity 501:
computational capability, e.g. CPU/GPU, memory, etc.
measurement capability, e.g. number of antenna panels, number of antennas at each panel, maximum bandwidth supported, etc.
communication capability, e.g. Uu, PC5, 802.11p, WLAN, bluetooth etc., and
energy consumption, battery status.

These parameters determine if the potential UE or potential RAN entity is capable of running a local entity of the invention, and how many functionalities it is able to take over.

As shown in FIG. 5, the capability check may be initiated by the entity 511 after occurrence of an external trigger 502. The entity 511, which can be the global entity or a higher level local entity, can transmit 503 the capability request when the network tends to offload its functionalities in order to meet certain performance requirements. For instance, establishing a local entity 501 at a UE which calculates its own position avoids having the measurements data transmitted to the CN. This reduces the network traffic significantly when the number of UEs increases. Also, the position is available directly on the UE side, leading to low latency which is crucial for real-time applications.

According to FIG. 5, the entity 511 transmits 503 the capability request, and receives 504 capability information of the potential UE or the potential RAN entity. Then, the entity 511 carries out a capability verification 505.

Figure 6:
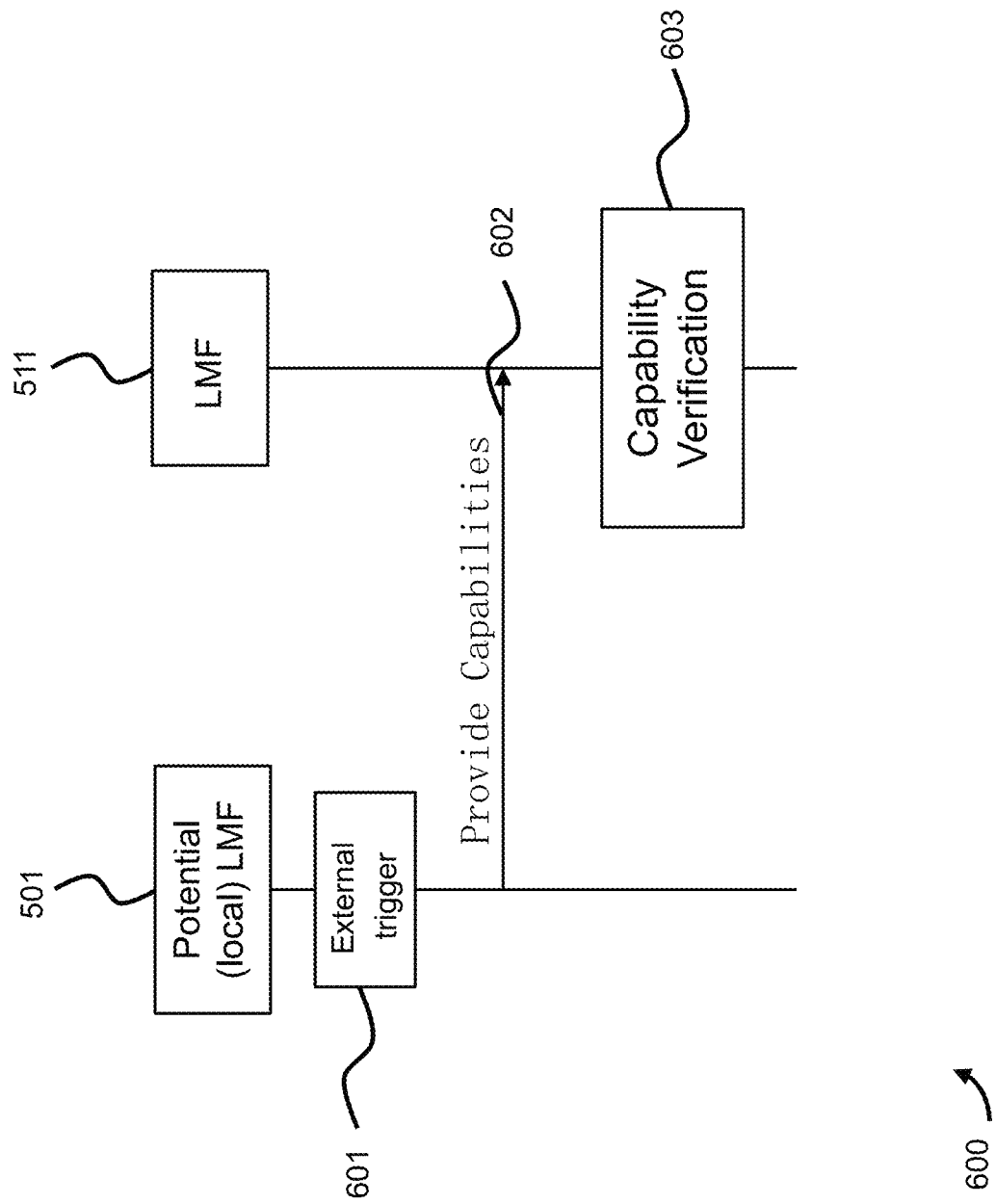
FIG. 6 shows a procedure for capability verification according to a further embodiment.

FIG. 6 shows a procedure 600 for capability verification according to a further embodiment. Compared to FIG. 5, the procedure of FIG. 6 is initiated by the potential local entity 501, and, for example, by an external trigger 601. The entity 511 receives 602 capability information of the potential UE or the potential RAN entity that is designed to run the potential local entity 501. Similar to FIG. 5, the entity 511 then carries out a capability verification 603.

The procedure 600 of FIG. 6 can be used e.g. when a potential local entity 501 in the RAN (e.g. a UE) is triggered externally to provide capabilities to the network. A UE intends to either calculate its own position or become a group master which serves as a positioning engine for a group of devices in its vicinity.

Figure 7:
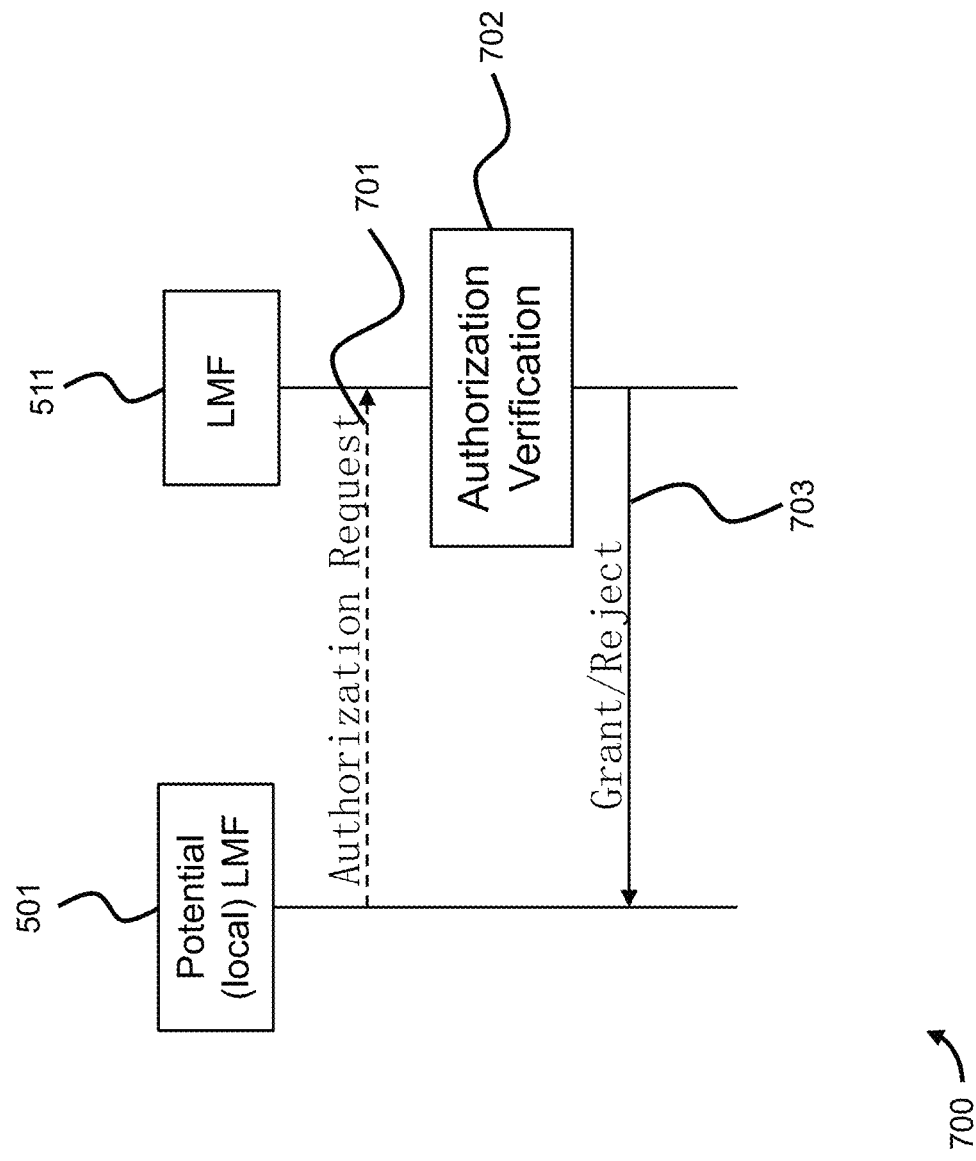
FIG. 7 shows a procedure for authorization according to a further embodiment.

FIG. 7 shows a procedure 700 for authorization according to a further embodiment.

Here, the entity 511, e.g. the local entity 302, 312 or the global entity 322, can be configured to:
receive 701 an authorization request, such as from a user equipment and/or an access network, and
transmit 703 an authorization response, such as to a user equipment and/or an access network.

After a capability verification 702, the entity 511 determines if an authorization can be granted to run the potential local entity 501. The authorization can be based on certain criteria, especially certain criteria regarding the potential UE or the potential RAN entity that is designed to run the potential local entity 501. The criteria may include at least one of:
ability of the potential UE or the potential RAN entity to calculate UE positions using network-specific methods based on location information,
ability of the potential UE or the potential RAN entity to achieve the target positioning accuracy,
ability of the potential UE or the potential RAN entity to provide location service to other UEs in a group, and
whether a network-specific charging policy can be applied.

The authorization may be requested 701 by the RAN or by a UE, or may be dictated by the entity 511.

If the outcome of the capability verification 505, 603 and/or the authorization verification 702 is positive, the potential local entity 501 can be established so as to obtain a new local entity 302, 312 as shown e.g. in FIG. 3. The establishment of the potential local entity 501 allows for a variety of new service types. Examples may include but are not limited to, cooperation service and map service.

Figure 8:
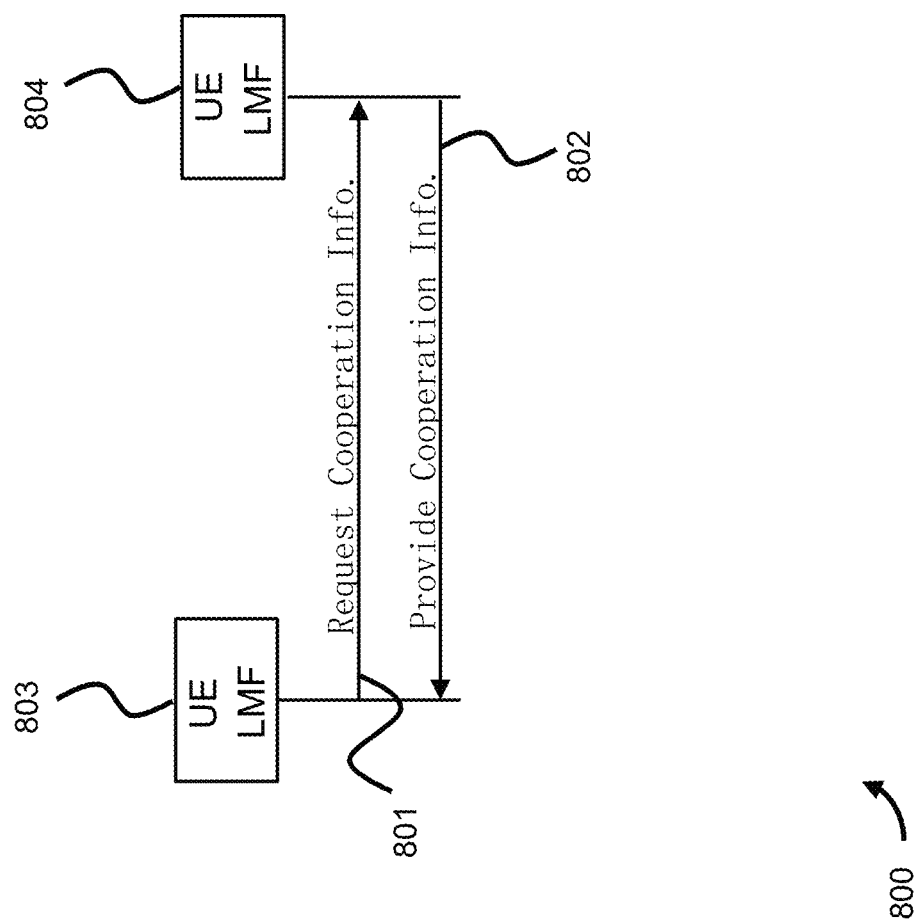
FIG. 8 shows a procedure for location service management, such as for cooperation service, according to a further embodiment.

FIG. 8 shows a procedure 800 for location service management, such as for cooperation service, according to a further embodiment.

Cooperation service: a variety of literature has shown that cooperation among agents can significantly improve localization accuracy and reduce localization outage probabilities [HlinkaMag, WymCoop, MWin2].

A local entity 803 may request 801 cooperation service from another local entity 804 that can be either a peer local entity or a higher level entity. If the local entity 803 is a UE local entity, the peer local entity can be another UE local entity while the higher level entity can be a RAN local entity or a global entity. The cooperation service request can be a request 801 for cooperation information. As a response to the request 801 for cooperation information, the other local entity 804 transmits 802 the requested cooperation information to the local entity 803.

The cooperation information may include at least one of the following parameters:
location coordinates of a reference point and its accuracy,
specific measurement information and accuracy,
sensor data or other statistical information, and
positioning method available or used.

FIG. 9 shows procedures 900, 910, 920 for location service management, such as for map service, according to further embodiments.

A local entity can build up a local radio reflector and scatterer map or a geographical map based on the location information received over time. Such a map includes a list of features' coordinates and accuracy. This map can be utilized to enhance positioning accuracy of a local area or the overall system performance. Furthermore, this map can be maintained and shared between local entities or reported to the global entity.

FIG. 9 (a) shows a map building procedure 900. A local entity 903 run, e.g., at UE can collect 901 map information over time, such as from a RAN local entity 904. After generating a map based on the collected map information, the local entity 903 provides 902 the map or map information to the RAN local entity 904.

FIG. 9 (b) shows a map updating procedure 910. The RAN local entity 904 requests 911 an update of the map. After updating the map based on the request 911, the local entity 903 provides 912 the updated map to the RAN local entity 904.

FIG. 9 (c) shows a map sharing procedure 920. Another local entity 923, which can be of the form of a UE local entity, requests 921 a map or map information to the RAN local entity 904 that has previously received 902, 912 the map or map information. In response to the request 921, the RAN local entity 904 transmits 922 the map or map information to the other local entity 923.

A location group management is supported by further embodiments.

Given the hierarchical structure of the local and global entities, a higher level local entity can be responsible to manage a group of lower level local entities. The global entity in the CN keeps track of the lower level local entities and dynamically determines the instantiation, configuration, migration and deletion of the local entities. The local entities may form a collaboration group within which location information can be shared under certain privacy agreements. A higher level local or global entity manages the grouping of lower level local entities and guarantees the quality of location service within the group. The higher level local or global entity is entitled to optimize the task splitting within the group in order to improve the overall efficiency.

For an end-level local entity, this management functionality is applied to the grouping of UEs. The local entity collects location information from the UEs within the group and provides location service with the network-guaranteed quality.

The network may define a number of categories of local entities with a given set of functionalities.

FIG. 10 shows procedures 1000, 1010 for location performance control according to a further embodiment.

The global entity 322, together with the network authorized local entities 404, which may be UE local entities 302 and/or RAN local entities 312, ensure the performance of the location service. According to the quality of location service delivered, different charging policy may be applied.

Therefore, the local entity 404 should monitor the local positioning performance and report to the global LMF. As illustrated by the procedure 1000, the local entity 404 can receive 1001 a request for performance report from the global entity 322, monitor the local positioning performance and transmit 1002, 1003 a performance report to the global entity 322. The local entity 404 can transmit several performance reports.

Furthermore, the local entity 404 should predict 1012 the local positioning performance. Also, the local entity 404 should determine to reject a location service request when performance requirements cannot be met locally.

As illustrated by the procedure 1010, the UE 301 can send 1011 the location service request to the local entity 404 that carries out the performance prediction/check 1012 based on the location service request. Then, the local entity 404 forwards 1013 the location service request and information to the global entity 322. After the global entity 322 has carried out a location calculation and performance check 1014, the global entity 322 transmits a location service response to the UE 301 depending on the performance check 1014. If the performance requirement is met, then the global entity 322 sends the location service response, otherwise it informs the UE 301 of a service fail.

Instead of forwarding 1013 the location service request to the global entity 322, the local entity 404 may also reject the location service request, which means that the location service request is not forwarded. The local entity 404 may reject the location service request if, for example, latency requirement does not allow for forwarding.

Further embodiments support a local entity instantiation, configuration, migration and deletion.

The global entity and/or the higher-level local entity determine the instantiation, configuration, migration and deletion of lower-level local entities. These operations may be triggered based on requirements regarding scalability, latency, or positioning accuracy:

scalability: as the number of location service requests increases within a given geographical area, the global entity and/or the higher-level local entity may trigger instantiation of one or more lower-level local entities. The lower-level local entities take over the location determination within the region of interest, i.e. within the given geographical area. This reduces communication overhead in the centralized architecture where all location information of the UEs are conveyed to the global entity in the CN, allowing the system to adjust its service capacity.

latency: local entities established at different levels, namely in RAN at the mobile edge, or directly at UEs, offer the potential to meet different levels of latency requirements.

positioning accuracy: different positioning method may be configured at the local entity in RAN and UE according to the accuracy requirement. The local entity also allows the accommodating entity to dynamically exploit local information to improve positioning accuracy. For instance, a vehicular UE may carry out radar sensor and/or sidelink measurement to obtain relative position to a desired neighbor UE and exchange location information with this desired neighbor UE so as to improve the positioning accuracy.

Also based on the abovementioned factors, the functionalities of local entities can be dynamically configured by the global entity and/or by higher-level local entities. Taking into account the overall system dynamics, for instance in networks of moving vehicles and robots, the local entity may be deployed and migrated to an entity (UE or part of RAN) which optimizes the system performance.

Figure 11:
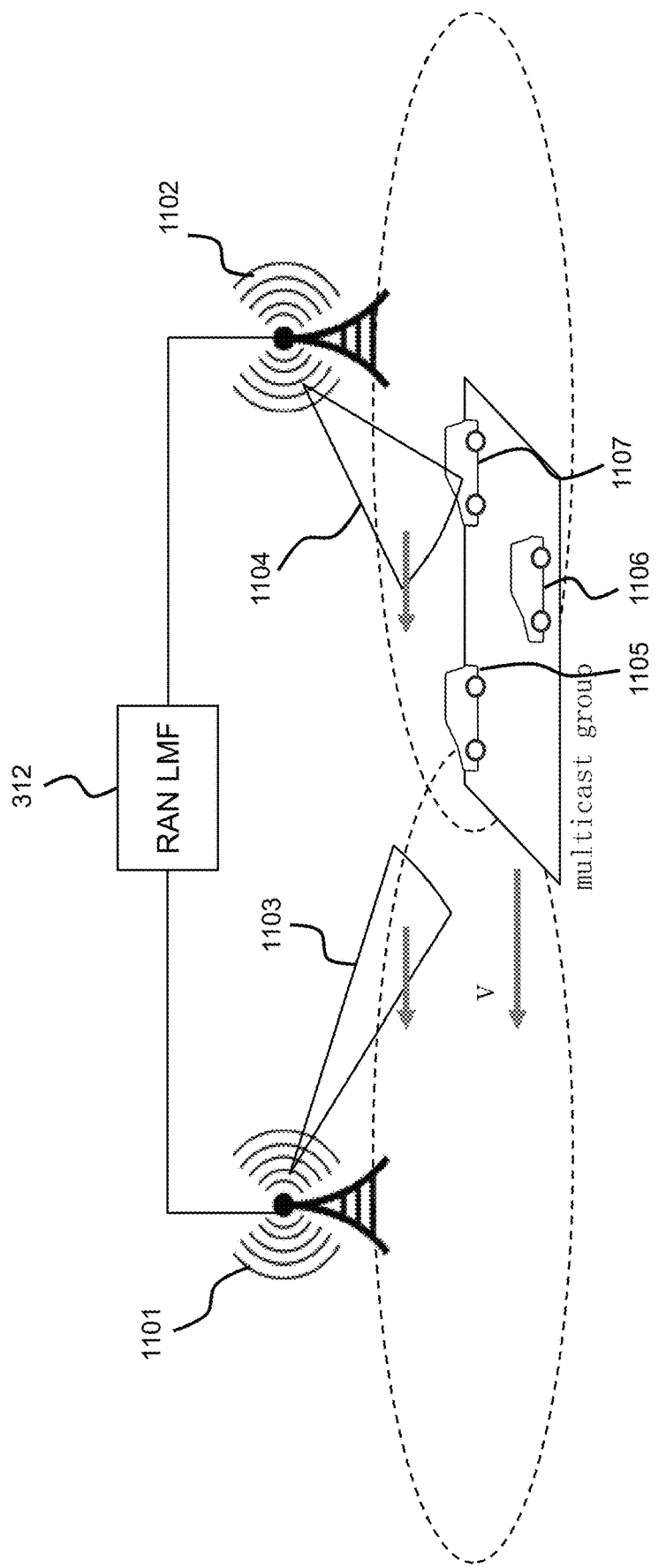
FIG. 11 shows a system for group location service with a master local entity according to a further embodiment.

FIG. 11 shows a system 1100 for group location service with a master local entity according to a further embodiment. For example, FIG. 11 shows a location-aware beamforming assisted by the RAN local entity 312, the master local entity being the RAN local entity.

The system 1100 includes the RAN local entity 312 connected to different base stations 1101, 1102. Several vehicles 1105, 1106, 1107 define a multicast group. The base stations 1101, 1102 are configured to carry out a beamforming 1103, 1104 for transmission to the multicast group. The multicast group includes at least one target UE. The RAN local entity can then determine the location of the target UE according to the invention as well as the location of the multicast group based on the location of the target UE.

The location of the target UE and/or the location of the multicast group is transmitted by the RAN local entity 312 to the base stations 1101, 1102. Accordingly, the base stations 1101, 1102 can perform a location-aware beamforming based on the location information received from the RAN local entity 312.

The RAN local entity 312 may dynamically determine the bandwidth of reference signal in order to achieve the required timing measurement accuracy. In addition, real-time availability of location information in RAN facilitates NR operations such as location based multicasting, beam tracking and fast beam recovery in high mobility scenarios, as illustrated in FIG. 11.

The RAN local entity 312 provides enhanced location service within the coverage area. Given the technology advances on the mobile edge side, the RAN local entity 312 allows for flexible resource allocation taking into account scalable requirements in terms of accuracy and latency in the region of interest.

Figure 12:
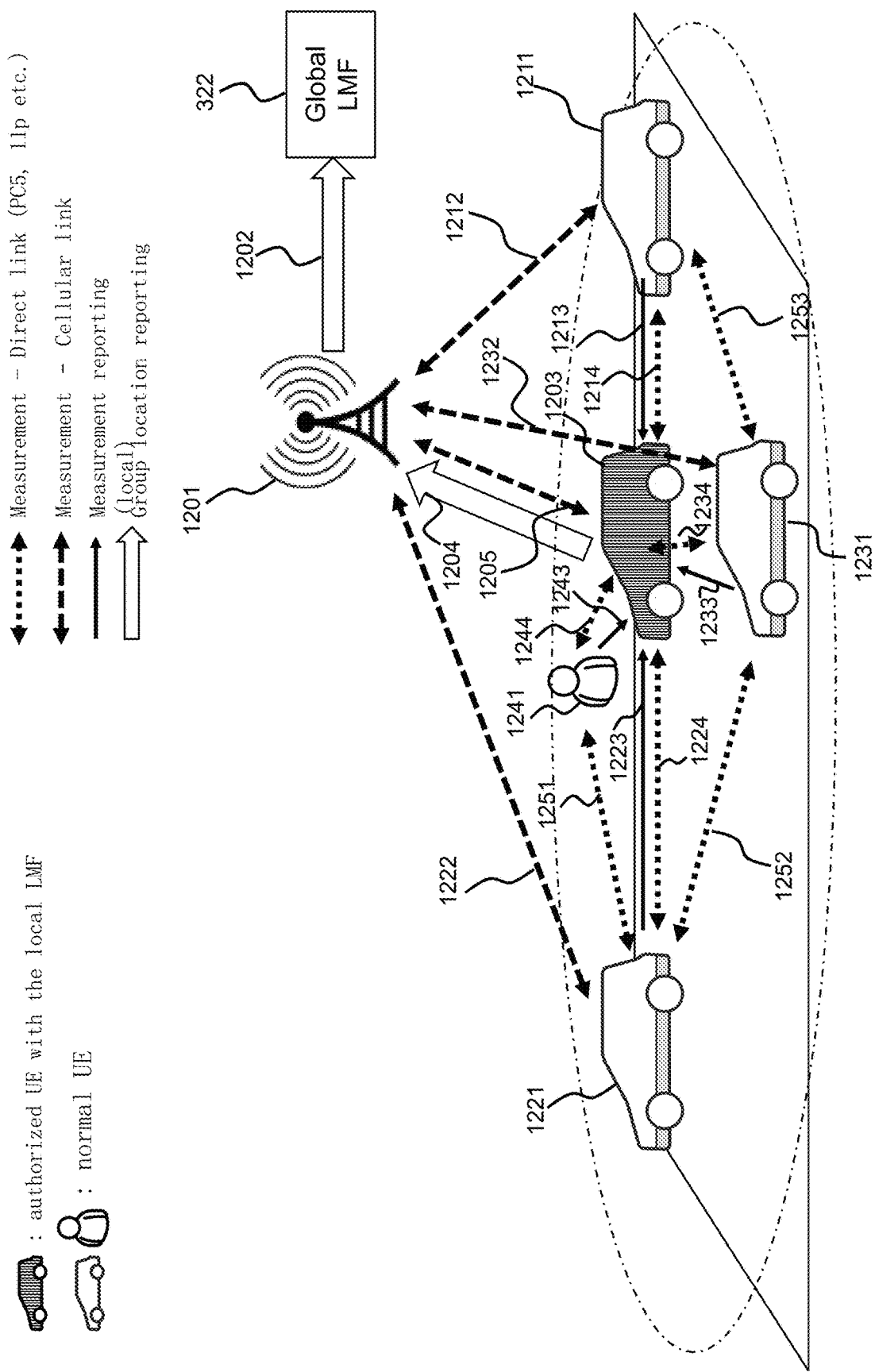
FIG. 12 shows a system for group location service with a master local entity according to a further embodiment.

FIG. 12 shows a system 1200 for group location service with a master local entity according to a further embodiment. FIG. 12 shows a system 1200 for a group location service with a master local entity being the UE local entity.

The system 1200 includes a master UE local entity, which is a master local entity located at a master UE 1203. The system 1200 includes further UEs 1211, 1221, 1231, 1241, which do not run a local entity. Some UEs of the system 1200 may be part of respective vehicles, as illustrated by references 1203, 1211, 1221, 1231.

The UEs 1203, 1211, 1221, 1231 can communicate with a base station 1201 by means of respective links or cellular links 1205, 1212, 1222, 1232. The UEs 1211, 1221, 1231, 1241 can communicate with the master UE 1203 by means of respective direct links or sidelinks 1214, 1224, 1234, 1244.

The authorized local entity in the master UE 1203 serves as a local fusion center, capable of localizing a group of UEs 1211, 1221, 1231, 1241 in its vicinity with network assistance. The other normal UEs 1211, 1221, 1231, 1241 within the group can obtain measurement information such as ToA, Time Difference of Arrival (TDoA), AoD and AoA over the cellular links 1205, 1212, 1222, 1232, but cannot calculate position by themselves.

As illustrated in FIG. 12, the normal UEs 1211, 1221, 1231 obtain individual measurements over the cellular links 1212, 1222, 1232 and then request location service to the master UE in the local group. These pieces of measurement information are collected 1213, 1223, 1233 at the master UE 1203 over the sidelinks 1214, 1224, 1234. The local entity in the master UE 1203 calculates the position for the normal UEs 1211, 1221, 1231 and reports 1204 the location of the group to the base station 1201. The local entity in the master UE 1203 may also report 1204 corresponding accuracy information. The reported location and/or accuracy can be further transmitted 1202 from the base station 1201 to the global entity 322 in the CN.

The UEs 1211, 1221, 1231, 1241 in the group may carry out additional relative measurements using the sidelink or RAT-independent technology such as sensor/radar and exploit these pieces of information to enhance the overall localization performance of the group. The relative measurements can use the sidelinks 1214, 1224, 1234, 1244 between the master UE 1203 and the respective UEs 1211, 1221, 1231, 1241. In addition thereto, the relative measurements can use the sidelinks 1251, 1252, 1253 between the UEs 1211, 1221, 1231, 1241. The additional relative measurements are then transmitted 1213, 1223, 1233, 1243 to the master UE 1203.

Alternatively, the relative measurements using the sidelink or RAT-independent technology can be carried out by the master UE 1203 using the sidelinks 1214, 1224, 1234, 1244 between the master UE 1203 and the respective UEs 1211, 1221, 1231, 1241.

The local entity at the master UE 1203 can provide location service response to the normal UEs 1211, 1221, 1231, 1241 of the group and report the group location to the global entity 322.

Figure 13:
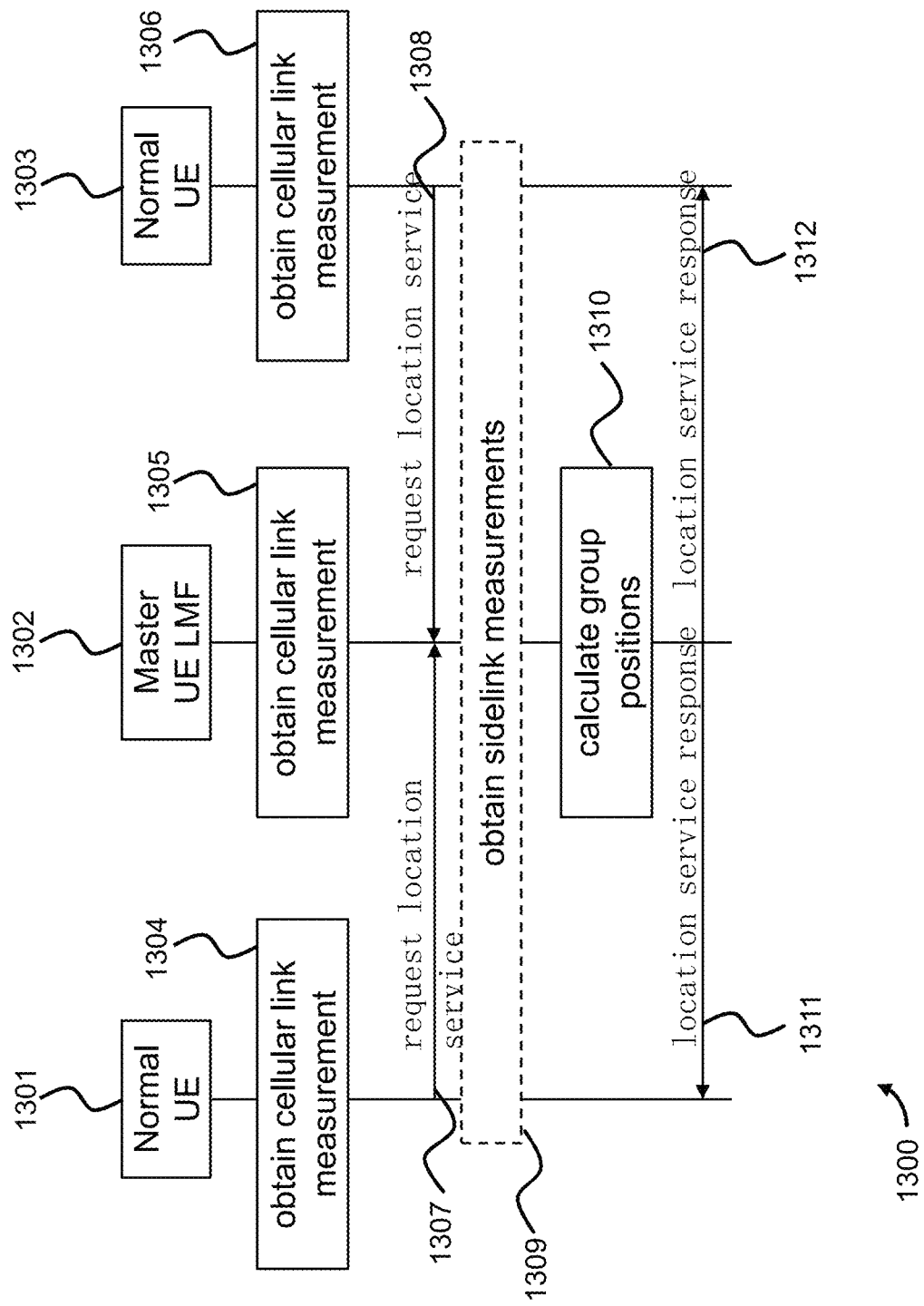
FIG. 13 shows a procedure according to the embodiment of FIG. 12.

FIG. 13 shows a procedure 1300 according to the embodiment of FIG. 12. Each normal UE 1301, 1303 and the master UE 1302 obtain 1304, 1305, 1306 cellular link measurement, i.e. location information. The normal UEs 1301, 1303 transmit 1307 1308 requests for location service to the master UE 1302. The master UE 1302 calculates 1310 the location of the group constituted by the normal UEs and the master UE. Then, the master UE 1302 can transmit a location service response 1311, 1312, which includes the group location, to the normal UEs. Optionally, the master UE 1302 can obtain sidelink measurements, or the normal UEs can obtain and transmit 1309 sidelink measurements to the master UE, so that the group location can be calculated based on these further sidelink measurements.

The group location service with a local master, as illustrated by the embodiment of FIG. 11 and by the embodiment of FIGS. 12 and 13, offers advantages, such as:
  lower latency can be achieved since the local entity is closer to the end user,
  since measurement information is shared locally within the group, the communication overhead can be significantly reduced.

This scheme can be applied to the convoy/platooning scenario where accurate positioning is required at either vehicles or the network/V2X (Vehicle-to-everything) server in real time.

Figure 14B:
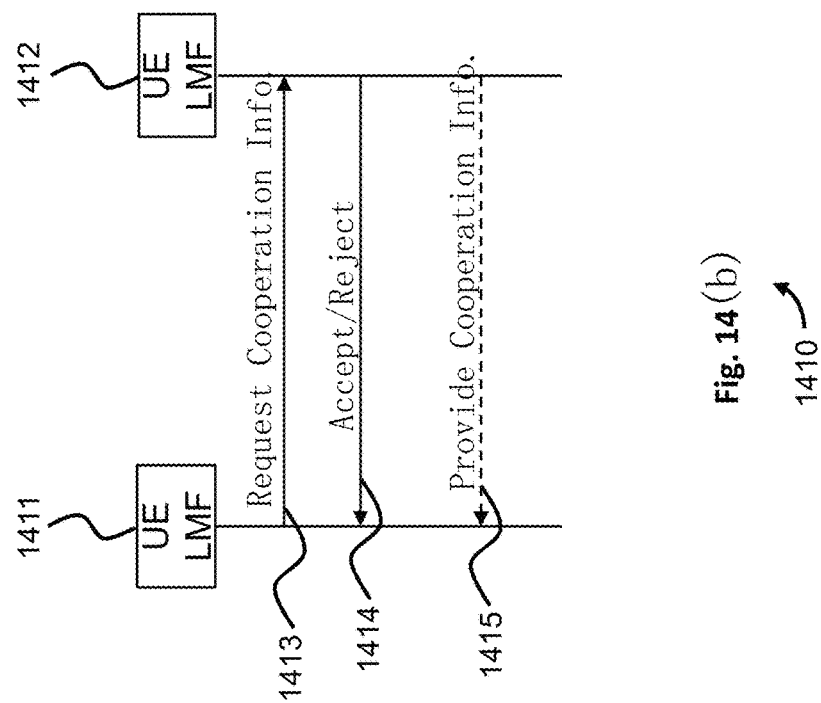
FIG. 14(b) shows a procedure for cooperative localization according to a further embodiment.
Figure 14A:
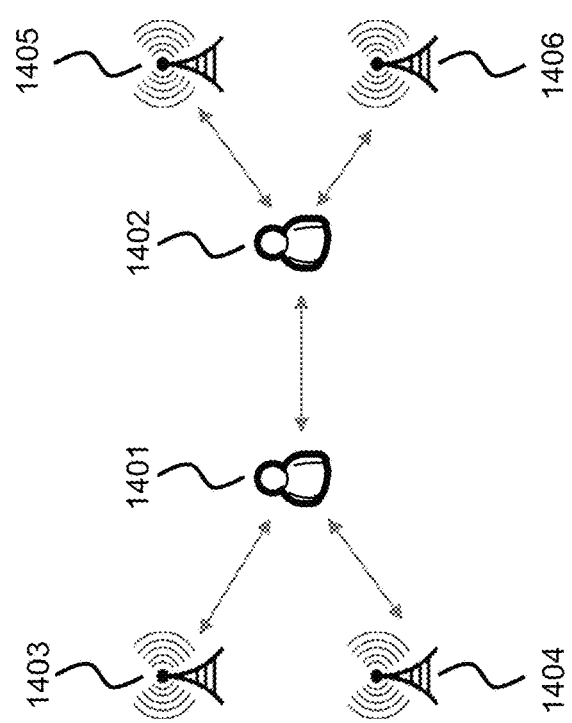
FIG. 14(a) shows a system for cooperative localization according to a further embodiment.

FIG. 14 shows a system 1400 and a procedure 1410 for cooperative localization according to a further embodiment.

RAT-dependent positioning technologies rely on the radio communication between UEs and reference nodes. However, in harsh environments due to radio blockage or limited reference node deployment, a precise determination of the location of UEs becomes a challenging task. In this situation, cooperation among UEs can significantly improve localization accuracy and reduce localization outage probabilities.

The system 1400 includes a group of UEs 1401, 1402 that are each in communication with one or more base stations 1403, 1404, 1405, 1406. In the embodiment of FIG. 14, it is assumed that the group of UEs 1401, 1402 do not obtain sufficient measurement information from the reference nodes within their communication range. Thus, the UEs 1401, 1402 cannot estimate their position with the required accuracy. The UEs 1401, 1402 may request to establish respective UE local entities 1411, 1412, where each UE 1401, 1402 may run a UE local entity 1411, 1412.

The UE local entities 1411, 1412 may be authorized to exchange cooperation information with each other in order that their positions can be collaboratively determined, shown in FIG. 14. Alternatively, the group of collaborating UEs 1411, 1412 can be dictated by a higher-level entity. The higher-level entity or the UE local entities 1411, 1412 may specify the type, format and encryption of the information to be shared within the collaboration group.

The procedure 1410 for exchanging cooperation information can include a first UE local entity 1411 sending 1413 a request for cooperation to a second UE local entity 1412. The second UE local entity 1412 transmits 1414 a response to the first UE local entity 1411 so as to accept or reject the cooperation request. Depending on the response, the second UE local entity 1412 may transmit 1415 the requested cooperation information to the first UE local entity 1411.

FIG. 15 shows a system 1500 for simultaneous localization and mapping (SLAM) according to a further embodiment.

SLAM is for example traditionally applied for localizing a mobile robot in an unknown environment. SLAM functions by incrementally building a consistent map of this environment while simultaneously determining the robot's location within this map. SLAM is e.g. defined in H. Durrant-Whyte, T. Bailey, Simultaneous localization and mapping: Part I, IEEE Robot. Autom. Mag. Vol. 13, No. 2, pp. 99-110, June 2006. Such a concept can be applied to the UE localization problem in the cellular radio network as can be taken from G. Soatti, M. Nicoli, N. Garcia, B. Denis, R. Reulefs, H. Wymeersch, Implicit cooperative positioning in vehicular networks, arXiv:1709.01292v1, September 2017, and from C. Gentner, T. Jost, W. Wang, S. Zhang, A. Dammann, U-C. Fiebig, Multipath assisted positioning with simultaneous localization and mapping, IEEE transactions on wireless communications, vol. 15, No. 9, September 2016.

Figure 15B:
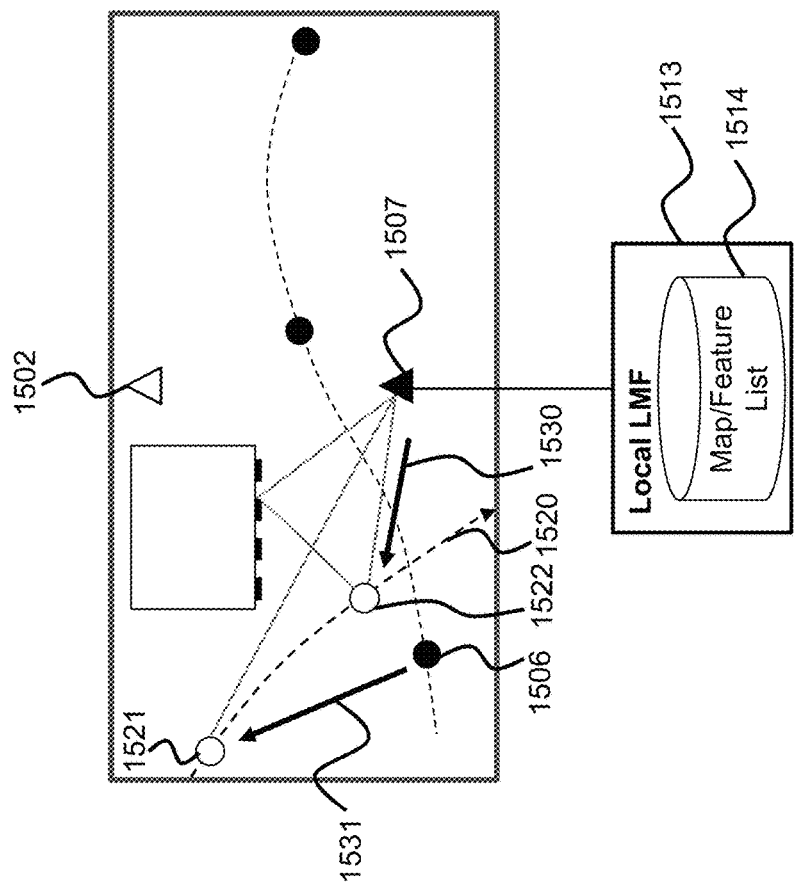
FIG. 15(b) shows a system for simultaneous localization and mapping (SLAM) according to a further embodiment.
Figure 15A:
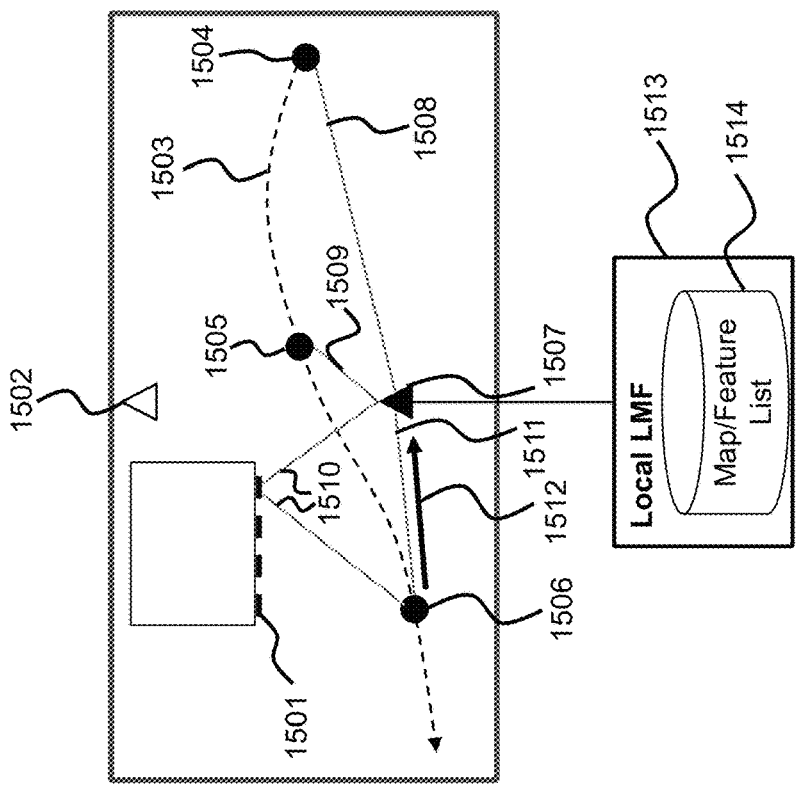
FIG. 15(a) shows a system for simultaneous localization and mapping (SLAM) according to a further embodiment.

In FIG. 15(a), a UE 1504 running a UE local entity moves according to a trajectory 1503 to different positions 1505, 1506. The UE 1504 may calculate its position while moving within the region of interest. The UE 1504 identifies one or more line-of-sight (LoS) paths 1508, 1509, 1511 to transmit receive points (TRP) 1507. As it moves along the trajectory 1503, the UE 1504 identifies one or more non-line-of-sight (NLoS) paths 1510 to the TRP 1507. With the NLoS paths identified, a number of radio reflectors or scatterers 1501 or corresponding virtual transmit receive points (VTRPs) 1502 can be localized as well, known as the features.

This list of features may be collected 1512 by a (static) RAN local entity 1513, utilized as a map of the region of interest. By letting the UE local entity report 1512 the feature list to the RAN local entity 1513, a detailed map or feature list 1514 can be incrementally constructed and maintained at the RAN local entity 1513.

FIG. 15(b) shows a second UE 1521, 1522 moving according to a trajectory 1520. The second UE 1522, which can run a UE local entity, can retrieve 1530 the map or feature list 1514 from the RAN local entity 1513. Alternatively, FIG. 15(b) also shows that the local entity of the UE 1506 can share 1531 the map or feature list directly with the second UE 1521 over a sidelink.

A well-maintained map or feature list may be utilized to further enhance localization performance within the region of interest or improve the system performance.

Figure 16:
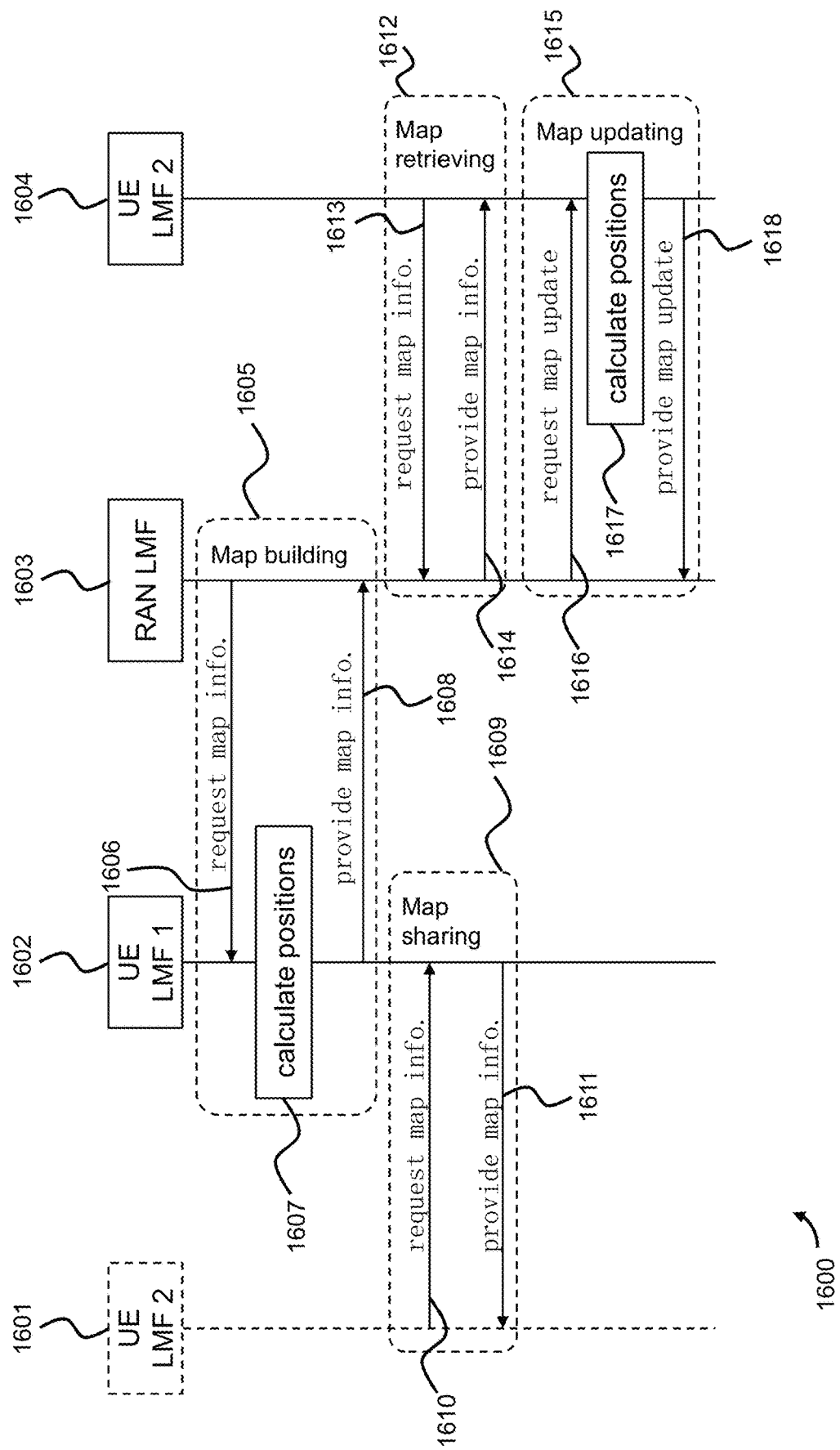
FIG. 16 shows a procedure 1600 according to the system of FIG. 15.

FIG. 16 shows a procedure 1600 according to the system of FIG. 15. According to a map building process 1605, a first UE local entity 1602 can request 1606 map information, calculate 1607 positions of the features, and provide 1608 the map information to a RAN local entity 1603.

According to a map sharing process 1609, a second UE local entity 1601 can request 1610 map information to the first UE local entity 1602, where the first UE local entity 1602 then responds by transmitting 1611 the map information to the second UE local entity 1601.

According to a map retrieving process 1612, a third UE local entity 1604 can request 1613 map information to the RAN local entity 1603, which then responds by transmitting 1614 the requested map information to the third UE local entity 1604.

According to a map updating process 1615, the RAN local entity 1603 requests 1616 a map update to the third UE local entity 1604, which calculates positions 1617 of e.g. new features and then responds by transmitting 1618 the requested map update to the RAN local entity 1603.

Applications of the map building, map retrieving, map updating and map sharing include indoor positioning within smart factories, positioning in GPS-denied though rich-scattered scenario such as urban canyon.

Within the context of the invention, location information includes one or more of the following:
Location measurement information, e.g. ToA, AoD, AoA, GPS coordinates, etc. over downlink, uplink as well as sidelink,
Cooperation information,
Map Information, namely a list of features' coordinates and corresponding accuracy.
Location request may be any of the following:
Request for location of a target UE with/without corresponding accuracy and latency requirements,
Request for location of a list of features/landmarks with/without corresponding accuracy,
Request for location of a group of UEs with/without corresponding accuracy.
Performance information refers to one or more of the following:
Positioning accuracy,
Latency (response time),
Signaling overhead, corresponding network load, and
Throughput of location service.

Compared to the prior art that uses a global entity being a location server implemented in the CN, the embodiments propose a hierarchical location service architecture with local entities in RAN and/or UE. This decentralized structure offers manners to meet diverse levels of service requirements in terms of positioning accuracy, latency and scalability.

The embodiments propose a framework that includes a global entity and several local entities. The global entity manages the local entities in the following aspects:
Verify the capability of potential local entities,
Grant authorization,
Determine instantiation, configuration, migration and deletion of local entities,
Manage cooperation grouping of local entities and provide privacy rules for sharing information within the group,
Manage location service types,
Control and guarantee the overall performance,
Interact with local entities and provide the corresponding specifications, such as procedure and data structure,
Local entities implement reduced location management functionalities and typically are entitled to:
Collect location measurements in the vicinity,
Calculate the absolute or relative positions and estimate their accuracy, Communicate position-related information to other nodes in the vicinity, Manages the cooperative grouping and corresponding information sharing policy in its vicinity for localization purpose, Monitor and predict the local positioning performance, and Communicate with the global entity as well as with other local entities, The embodiments propose interfaces and procedures for communication between the global entity and the local entities, such as:

Between the global entity at the CN and the local entity at the RAN, as well as between the global entity at the CN and the local entity at the UE, Between the local entity at the RAN and the local entity at the UE, and Between local entities at the RAN, as well as between local entities at the UE.

The embodiments propose location/positioning methods with a collaboration between the global entity and the local entities.

Advantageously, the decentralized structure of the local entities according to the embodiments causes location services to be closer to the UE or end user. This allows for new service types that require real-time positioning and scalable accuracy requirement on the UE side. For future RAN with mobile edge computing center, enhanced location service may be shifted to the RAN side via the instantiation of a local entity in order to provide enhanced location service within a certain radio coverage. For a group of powerful UEs such as vehicles, a local entity may directly exploit local information by exchanging information over sidelink without loading the network by sending all measurement information to the global entity in the CN.

The proposed location service architecture offers potential to:

provide scalable location service quality,
reduce latency,
conserve network bandwidth,
allow for flexible deployment,
offer scalability when massive number of UEs are involved, and
generate new business model and profit.

Given the diverse requirements foreseen by 3GPP TS22.261 V16.1.0 Service requirements for the 5G system; Stage 1 (Release 16) 2017 September, the proposed framework may serve as a key component to enable enhanced location service with network guaranteed performance.

While the embodiments have been illustrated and described in detail in the drawings and the foregoing description, such illustration and description are to be considered illustrative or exemplary and not restrictive. The embodiments are not limited to the disclosed embodiments. From reading the present disclosure, other modifications will be apparent to a person of ordinary skill in the art. Such modifications may involve other features, which are already known in the art and may be used instead of or in addition to features already described herein.

The embodiments have been described in conjunction with various embodiments herein. However, other variations to the disclosed embodiments can be understood and effected by those of ordinary skill in the art. A single processor or other unit may fulfil the functions of several items described in the embodiments. The mere fact that certain measures are recited in mutually different embodiments does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the embodiments has been described with reference to specific features and embodiments thereof, it is evident that various modifications and combinations can be made thereto without departing from the spirit and scope of the invention.

The invention claimed is:

1. A local entity for determination of user equipment location in a mobile communication network, comprising:
a first user equipment and an access network, wherein the local entity is configured to be at least one of run on the first user equipment and in the access network, wherein the local entity is configured to:
transmit a capability request,
receive capability information of the first user equipment or of the access network, wherein the capability information indicates the capability of the first user equipment or the access network to run the local entity and the capability information comprises at least one of computational capability and communication capability,
receive location information of a target user equipment, and
determine a location of the target user equipment based on the location information.

2. The local entity according to claim 1, wherein the local entity is further configured to:
receive a location request, from at least one of the target user equipment, another local entity, and an entity of a core network; and
determine the location based on the location request.

3. The local entity according to claim 1, wherein the target user equipment is the first user equipment, or the target user equipment is a second user equipment.

4. The local entity according to claim 1, wherein the location information comprises at least one of downlink, uplink, and sidelink location information of the target user equipment.

5. The local entity according to claim 1, wherein the local entity is further configured to:
determine an accuracy of the location of the target user equipment based on the location information.

6. The local entity according to claim 1, wherein the local entity is further configured to:
receive an authorization request from at least one of the first user equipment and the access network; and
transmit an authorization response to at least one of the first user equipment and the access network.

7. The local entity according to claim 1, wherein the local entity is further configured to:
receive location information of one or more features,
determine a location of the one or more features based on the respective location information, and
generate a map or list of the location of the one or more features.

8. The local entity according to claim 1, wherein the local entity is further configured to:
receive at least one of a location and location information for one or more features;
determine an updated location of the one or more features based on at least one of the received location and location information; and
transmit the updated location of the one or more features.

9. The local entity according to claim 7, wherein the local entity is further configured to:
- receive a location request for the one or more features, and
- transmit locations of the one or more requested features in response to the location request.

10. The local entity according to claim 1, wherein the local entity is further configured to:
- determine a performance information of the determination of the location of the target user equipment, and
- transmit the performance information.

11. The local entity according to claim 10, wherein the local entity is further configured to:
- forward a location request to another entity for determination of the user equipment location depending on the performance information.

12. The local entity, according to claim 1, wherein the local entity is further configured to at least one of transmit and receive location information from a second local entity.

13. A system for determination of user equipment location in a mobile communication network, comprising:
- user equipment or an access network configured to:
  - at least one of transmit, to a network entity, capability information, wherein the capability information indicates the capability of the user equipment or the access network to run a local entity and the capability information comprises at least one of computational capability and communication capability; and
  - transmit an authorization request to run a local entity comprising
- a first user equipment and the access network, wherein the local entity is configured to be at least one of run on the first user equipment and in the access network, receive location information of a target user equipment, and determine a location of the target user equipment based on the location information.

14. A global entity for determination of user equipment location, wherein the global entity is configured to:
- receive capability information of hardware indicating its capability to run one or more local entities, wherein the capability information comprises at least one of computational capability and communication capability,
- instantiate the one or more local entities based on the capability information, and
- control the one or more local entities, the one or more local entities comprising at least a first user equipment and an access network, wherein the one or more local entities are configured to be at least one of run on the first user equipment and in the access network, wherein the local entity is configured to:
- receive location information of a target user equipment, and
- determine a location of the target user equipment based on the location information.

15. The global entity according to claim 14, wherein the global entity is configured to be run on hardware, the first user equipment, the access network, a core network, or a cloud.

16. The global entity according to claim 14, wherein the global entity is configured to:
- transmit a capability request.

17. The global entity according to claim 14, configured to:
- at least one of instantiate, configure and de-instantiate the one or more local entities based on at least one of a number of location requests and a performance information, at least one of a positioning latency, and accuracy.

* * * * *